(12) United States Patent
Choi et al.

(10) Patent No.: US 12,174,667 B2
(45) Date of Patent: Dec. 24, 2024

(54) DISPLAY DEVICE AND METHOD OF MANUFACTURING THE SAME

(71) Applicant: Samsung Display Co., Ltd., Yongin-si (KR)

(72) Inventors: Dongwon Choi, Seoul (KR); Beomjin Kim, Asan-si (KR); Jin Hwan Choi, Seoul (KR); Jonghwa Lee, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/894,636

(22) Filed: Aug. 24, 2022

(65) Prior Publication Data
US 2023/0176620 A1      Jun. 8, 2023

(30) Foreign Application Priority Data

Dec. 6, 2021   (KR) .................. 10-2021-0173151

(51) Int. Cl.
*G06F 1/16*      (2006.01)
*B05D 1/18*      (2006.01)
(Continued)

(52) U.S. Cl.
CPC ............ *G06F 1/1652* (2013.01); *B05D 1/18* (2013.01); *B32B 3/08* (2013.01); *B32B 7/022* (2019.01);
(Continued)

(58) Field of Classification Search
CPC ....... G06F 1/1652; G06F 1/1656; B32B 3/08; B32B 7/022; B32B 15/06; B32B 2307/51;
(Continued)

(56) References Cited

U.S. PATENT DOCUMENTS 9,940,892 B2    4/2018  Pang
10,074,824 B2   9/2018  Han et al.
(Continued)

FOREIGN PATENT DOCUMENTS

CN      214587754 U    *  11/2021
KR    1020170095636 A    8/2017
(Continued)

OTHER PUBLICATIONS

[NPL-1] Wen (CN 214587754 U), Nov. 2, 2021 (EPO machine translation to English). (Year: 2021).*
(Continued)

*Primary Examiner* — Maria V Ewald
*Assistant Examiner* — Donald M Flores, Jr.
(74) *Attorney, Agent, or Firm* — CANTOR COLBURN LLP

(57) ABSTRACT

A display device includes a display module rolled in a second direction crossing a first direction with respect to a rolling axis extending in the first direction and a module supporter disposed under the display module. The module supporter includes a support layer, a plurality of coating layers disposed in the support layer, extending in the first direction, and arranged in the second direction, and a plurality of support bars each being disposed in a corresponding coating layer among the plurality of coating layers.

18 Claims, 17 Drawing Sheets

(51) Int. Cl.
  *B32B 3/08* (2006.01)
  *B32B 7/022* (2019.01)
  *B32B 15/06* (2006.01)
(52) U.S. Cl.
  CPC ............ *B32B 15/06* (2013.01); *G06F 1/1656* (2013.01); *B32B 2307/51* (2013.01); *B32B 2457/20* (2013.01)
(58) Field of Classification Search
  CPC .................. B32B 2457/20; G09F 9/301; G02F 1/133305; G02F 1/133308
  See application file for complete search history.

(56) References Cited

U.S. PATENT DOCUMENTS

| | | | |
|---|---|---|---|
| 10,362,690 | B2 | 7/2019 | Han |
| 2011/0140995 | A1* | 6/2011 | Hamers .................. G09F 9/301 |
| | | | 345/30 |

FOREIGN PATENT DOCUMENTS

| | | |
|---|---|---|
| KR | 1020180036904 A | 4/2018 |
| KR | 1020200052621 A | 5/2020 |

OTHER PUBLICATIONS

[NPL-2] Luan et al. "Design and Fabrication of Heterogeneous, Deformable Substrates for the Mechanically Guided 3D Assembly"; Dec. 25, 2018, ACS Appl. Mater. Interfaces (2019), vol. 11, pp. 3482-3492. (Year: 2018).*

Luan, et al., Design and Fabrication of Heterogeneous, Deformable Substrates for the Mechanically Guided 3D Assembly, Applied Materials & Interfaces, 2019, 11, pp. 3482-3492.

Romeo, et al., Elastomeric substrates with embedded stiff platforms for stretchabel elctronics, 2013, American Institute of Physics, Appl. Phys. Lett. 102, pp. 131904-131905 (Apr. 2, 2013).

* cited by examiner

DISPLAY DEVICE AND METHOD OF MANUFACTURING THE SAME

This application claims priority to Korean Patent Application No. 10-2021-0173151, filed on Dec. 6, 2021, and all the benefits accruing therefrom under 35 U.S.C. § 119, the content of which in its entirety is herein incorporated by reference.

BACKGROUND

1. Field

Embodiments of the invention relate to a rollable display device. More particularly, embodiments of the invention relate to a rollable display device including a module supporter disposed under a display module.

2. Description of the Related Art

Electronic devices that provide an image to a user, such as a smart phone, a digital camera, a notebook computer, a navigation unit, and a smart television, include a display device to display the image. The display device generates the image and provides the image to the user through a display screen thereof.

In recent years, with a technological development for the display device, various types of display devices are being developed. Among them, a rollable display device that is easy to carry and improves convenience for a user is being actively developed.

SUMMARY

A rollable display panel used in the rollable display device has the advantage of being varied in shape, but it may be difficult to maintain a flatness when unrolled. Accordingly, there is a need to develop a technology for maintaining the flatness of the rollable display panel.

Embodiments of the invention provide a rollable display device capable of improving a surface quality of a display module when the display module is unrolled.

An embodiment of the invention provides a display device including a display module rolled in a second direction crossing a first direction with respect to a rolling axis extending in the first direction and a module supporter disposed under the display module. The module supporter includes a support layer, a plurality of coating layers disposed in the support layer, extending in the first direction, and arranged in the second direction, and a plurality of support bars each being disposed in a corresponding coating layer among the plurality of coating layers.

In an embodiment, the plurality of coating layers may have a modulus greater than a modulus of the support layer and smaller than a modulus of the plurality of support bars.

In an embodiment, the support layer may have a modulus equal to or greater than about 10 kilopascals (KPa) and equal to or smaller than about 100 KPa, the plurality of support bars may have a modulus equal to or greater than about 50 gigapascals (GPa) and equal to or smaller than about 500 GPa, and the plurality of coating layers may have a modulus equal to or greater than about 100 megapascals (MPa) and equal to or smaller than about 10 GPa.

In an embodiment, the plurality of coating layers may have a modulus corresponding to a median value of a sum of a modulus of the support layer and a modulus of the plurality of support bars.

In an embodiment, each of the plurality of support bars may include a metal material or a carbon fiber, each of the support layer and the plurality of coating layers may include a polymer material, and the support layer may include an elastomer of the polymer material.

In an embodiment, each of the plurality of support bars may have a quadrangular shape, a rhombus shape, an inverse trapezoidal shape, or an inverse triangular shape in a cross-section.

In an embodiment, the plurality of support bars may include first support bars and second support bars alternately arranged with the first support bars, the first support bars may be closer to an upper surface of the support layer adjacent to the display module than the second support bars are, the second support bars may be closer to a lower surface opposite to the upper surface than the first support bars are, and the first support bars may have a symmetrical shape with the second support bars with respect to the second direction in the cross-section.

In an embodiment, the first and second support bars may have a trapezoidal shape or a triangular shape in the cross-section.

In an embodiment, each of the plurality of support bars may have a width equal to or greater than about 0.4 millimeters (mm) and equal to or smaller than about 0.8 mm in the second direction.

In an embodiment, the plurality of support bars may include a center support bar disposed at a center of the module supporter and left support bars and right support bars, which are symmetrical with respect to the center support bar interposed therebetween in the second direction. The center support bar may have a smallest width in the second direction, and each of the left support bars and the right support bars may have a width in the second direction gradually increasing as a distance from the center support bar increases.

In an embodiment, each of the plurality of coating layers may have a thickness equal to or smaller than about 200 micrometers in the cross-section.

In an embodiment, an embodiment of the invention provides a display device including a display module rolled in a second direction crossing a first direction with respect to a rolling axis extending in the first direction and a module supporter disposed under the display module. The module supporter includes a support layer, a plurality of support bars disposed in the support layer, extending in the first direction, and arranged in the second direction, and a plurality of coating layers disposed in the support layer and surrounding at least a portion of the plurality of support bars. The plurality of coating layers has a modulus greater than a modulus of the support layer and smaller than a modulus of the plurality of support bars.

In an embodiment, the plurality of coating layers may extend in the first direction and are arranged in the second direction, and each of the plurality of support bars may be disposed in a corresponding coating layer among the plurality of coating layers.

In an embodiment, the support layer may have the modulus equal to or greater than about 10 KPa and equal to or smaller than about 100 KPa, the plurality of support bars may have the modulus equal to or greater than about 50 GPa and equal to or smaller than about 500 GPa, and the plurality of coating layers may have the modulus equal to or greater than about 100 MPa and equal to or smaller than about 10 GPa.

In an embodiment, the modulus of the plurality of coating layers may correspond to a median value of a sum of the modulus of the support layer and the modulus of the plurality of support bars.

In an embodiment, each of the support layer and the plurality of coating layers may include a polymer material, the plurality of support bars may include a metal material, and the support layer may include an elastomer of the polymer material.

In an embodiment, each of the plurality of support bars may have a quadrangular shape, a rhombus shape, an inverse trapezoidal shape, or an inverse triangular shape in a cross-section.

In an embodiment, the plurality of support bars may include first support bars and second support bars alternately arranged with the first support bars, the first support bars may be closer to an upper surface of the support layer adjacent to the display module than the second support bars are, the second support bars may be closer to a lower surface opposite to the upper surface than the first support bars are, and the first support bars may have a symmetrical shape with the second support bars with respect to the second direction in the cross-section.

In an embodiment, an embodiment of the invention provides a method of manufacturing a display device. The manufacturing method of the display device includes providing a metal plate including a plurality of branch portions arranged in a first direction and extending in a second direction crossing the first direction and including first ends and second ends opposite to the first ends and connection portions respectively connected to the first ends and the second ends of the plurality of branch portions and extending in the first direction, immersing the metal plate in a coating solution to form a coating layer surrounding the metal plate, dipping the metal plate coated with the coating layer into a suspension and curing the suspension to form a support layer covering the coating layer, and cutting the connection portions of the metal plate to form a plurality of support bars.

In an embodiment, the coating layer may have a modulus greater than a modulus of the support layer and smaller than a modulus of the plurality of support bars.

According to the above, when the display device is rolled, a deformation of the module supporter disposed under the display module is reduced, and thus, a surface quality of the display module is improved. In addition, an adhesion between the components disposed in the module supporter increases, and thus, an interfacial delamination is prevented from occurring.

BRIEF DESCRIPTION OF THE DRAWINGS

The above and other advantages of the invention will become readily apparent by reference to the following detailed description when considered in conjunction with the accompanying drawings, in which.

DETAILED DESCRIPTION

Figure 1:
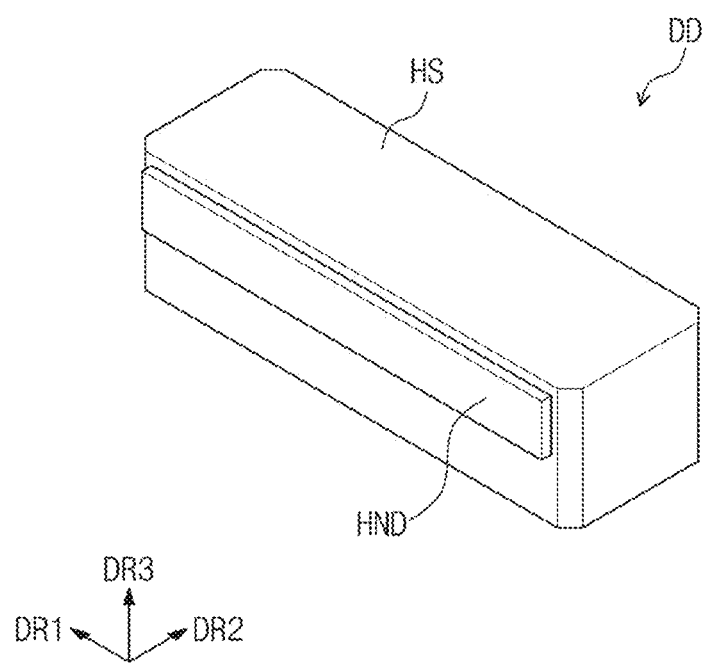
FIG. 1 is a perspective view of an embodiment of a display device according to the invention.

In the disclosure, it will be understood that when an element (or area, layer, or portion) is referred to as being "on", "connected to" or "coupled to" another element or layer, it can be directly on, connected or coupled to the other element or layer or intervening elements or layers may be present.

Like numerals refer to like elements throughout. In the drawings, the thickness, ratio, and dimension of components are exaggerated for effective description of the technical content. As used herein, the term "and/or" includes any and all combinations of one or more of the associated listed items.

It will be understood that, although the terms first, second, etc. may be used herein to describe various elements, these elements should not be limited by these terms. These terms are only used to distinguish one element from another element. Thus, a first element discussed below could be termed a second element without departing from the teachings of the disclosure. As used herein, the singular forms, "a", "an" and "the" are intended to include the plural forms as well, unless the context clearly indicates otherwise.

Spatially relative terms, such as "beneath", "below", "lower", "above", "upper" and the like, may be used herein for ease of description to describe one element or feature's relationship to another element(s) or feature(s) as illustrated in the drawing figures.

It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term "about" can mean within one or more standard deviations, or within ±30%, 20%, 10%, 5% of the stated value, for example.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the invention will be explained in detail with reference to the accompanying drawings.

Figure 2A:
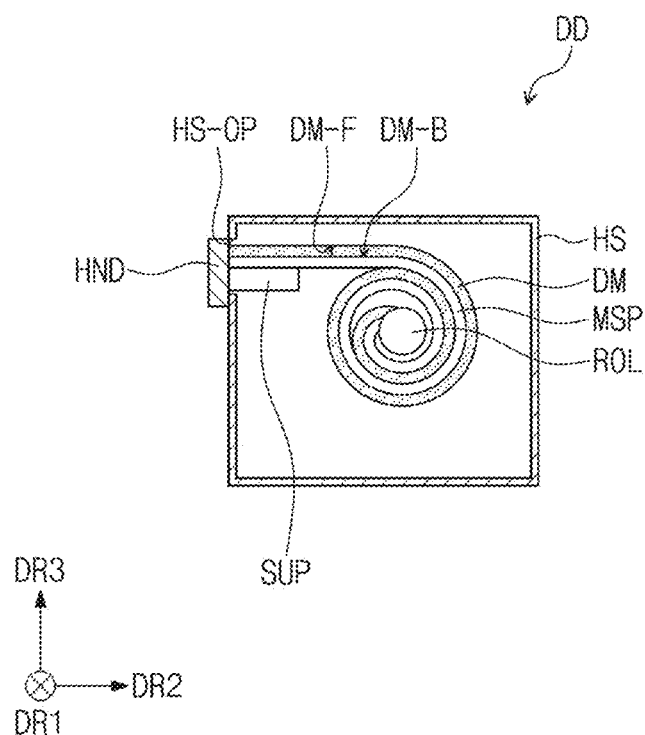
FIGS. 2A and 2B are cross-sectional views of an embodiment of a display device according to the invention.
Figure 2B:
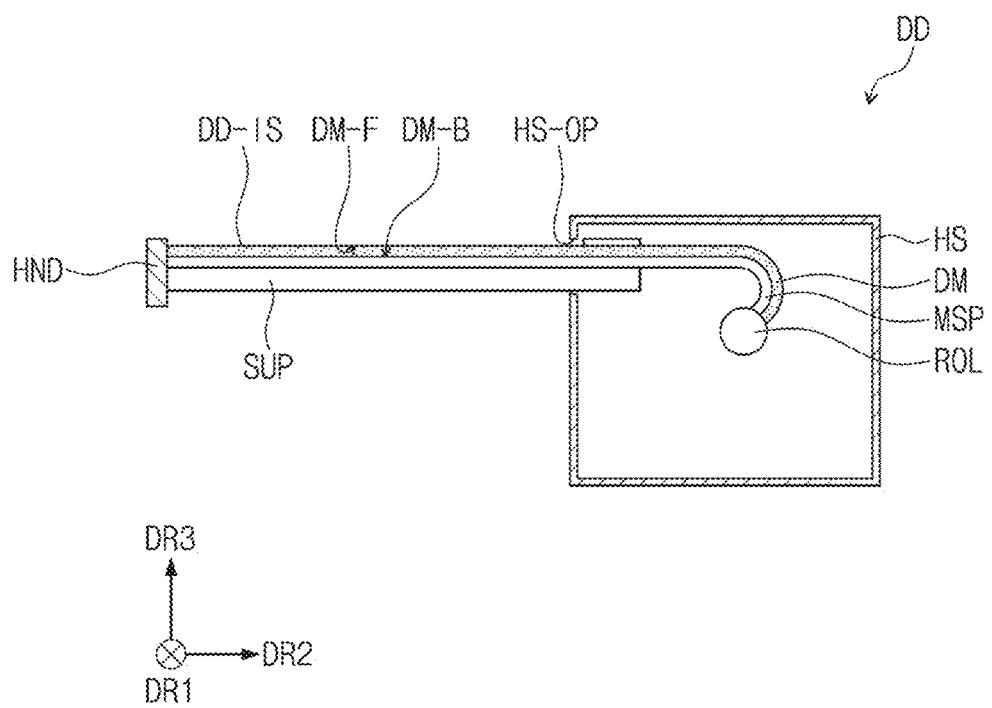

FIG. 1 is a perspective view of an embodiment of a display device DD according to the invention. FIGS. 2A and 2B are cross-sectional views of an embodiment of the display device DD according to the invention. FIG. 2A shows a state (hereinafter, also referred to as a first mode) in which the display device DD is rolled, and FIG. 2B shows a state (hereinafter, also referred to as a second mode) in which the display device DD is unrolled.

Referring to FIGS. 1, 2A, and 2B, the display device DD may include a housing HS, a handle HND, a roller ROL, a display module DM, a module supporter MSP, and a supporter SUP. The housing HS may be provided in a cuboidal shape and may accommodate the display module DM and the module supporter MSP.

The housing HS may be provided with an opening HS-OP defined through one of six surfaces thereof. The opening HS-OP may extend in a first direction DR1. The display module DM and the module supporter MSP, which are accommodated in the housing HS, may be exposed to the outside of the housing HS via the opening HS-OP.

FIG. 1 shows the housing HS having the cuboidal shape as an illustrative embodiment, however, the shape of the housing HS should not be limited to the cuboidal shape. The housing HS may have a variety of shapes as long as the housing HS may accommodate the display module DM and the module supporter MSP therein, which are rolled. That is, the housing HS may have any shape suitable for the purpose of use of the display device DD without limitation.

The handle HND may be disposed on the surface through which the opening HS-OP is defined among the six surfaces of the housing HS. The handle HND may be disposed such that at least a portion thereof overlaps the opening HS-OP. The handle HND may be coupled to one end of the display module DM and the module supporter MSP, which extend in the first direction DR1.

The handle HND may move farther from or closer to the housing HS with respect to a second direction DR2. In the case where the handle HND moves in a direction away from the housing HS, the state of the display device DD may be changed from the first mode to the second mode, and in the case where the handle HND moves in a direction closer to the housing HS, the state of the display device DD may be changed from the second mode to the first mode. The handle HND may be manipulated by a user.

However, the invention should not be limited thereto or thereby. In an embodiment, the handle HND may be omitted from the display device DD, and the display device DD may further include a separate driver to unroll the display module DM and the module supporter MSP to the outside of the housing HS in response to a user's operation.

The roller ROL may extend in the first direction DR1 and may be disposed in the housing HS. The roller ROL may be connected to the other end of the display module DM and the module supporter MSP, which is opposite to the one end of the display module DM and the module supporter MSP. The roller ROL may provide a rolling axis to the display module DM and the module supporter MSP.

The display module DM may be rolled in the second direction DR2 with respect to the rolling axis provided by the roller ROL in the first mode and then may be accommodated in the housing HS. When the state of the display device DD is changed from the first mode to the second mode by moving the handle HND in the second direction DR2, the display module DM may be exposed to the outside of the housing HS via the opening HS-OP of the housing HS.

A portion of the display module DM, which is exposed to the outside of the housing HS in the second mode, may be provided as a display surface DD-IS. The display surface DD-IS may be substantially parallel to a plane defined by the first direction DR1 and the second direction DR2. The surface provided as the display surface DD-IS in the second mode may be defined as a front surface DM-F of the display module DM, and a surface opposite to the front surface DM-F may be defined as a rear surface DM-B of the display module DM. In the second mode, the front surface DM-F and the rear surface DM-B of the display module DM may face each other in the third direction DR3. In an embodiment, in the second mode, the display surface DD-IS may provide an image in the third direction DR3, which is a direction normal to the front surface DM-F.

The module supporter MSP may be attached to the rear surface DM-B of the display module DM. FIGS. 2A and 2B show a structure in which the display module DM and the module supporter MSP are consecutively arranged, however, an adhesive layer may be further disposed between the display module DM and the module supporter MSP.

The module supporter MSP may reduce a strain applied to the display module DM in the first mode. In addition, the module supporter MSP may support the display module DM such that the display module DM may not be sagged downward in the second mode. According to the invention, the module supporter MSP may provide a flat surface in the second mode, and thus, the display device DD may have a high surface quality. The module supporter MSP will be described in detail later.

The supporter SUP may be disposed under the module supporter MSP adjacent to the handle HND in the first mode and may be connected to the handle HND. In an embodiment, the supporter SUP may be provided in plural, and the supporters SUP may be disposed under the module supporter MSP and may be disposed at opposite ends of the module supporter MSP to be spaced apart from each other in the first direction DR1.

The display module DM and the module supporter MSP may be guided by the supporter SUP when the state of the display device DD is changed from the first mode to the second mode. In an embodiment, when the user unrolls the display module DM and the module supporter MSP using the handle HND, the supporter SUP may include a plurality of assemblies that are coupled to each other in a series of steps and extending in the second direction DR2 while the handle HND is being pulled away from the housing HS. In the second mode, opposite ends of the display module DM and the module supporter MSP, which are opposite to each other in the first direction DR1, may be supported by the supporter SUP, and thus, the display module DM and the module supporter MSP may not be sagged downward.

Figure 3A:
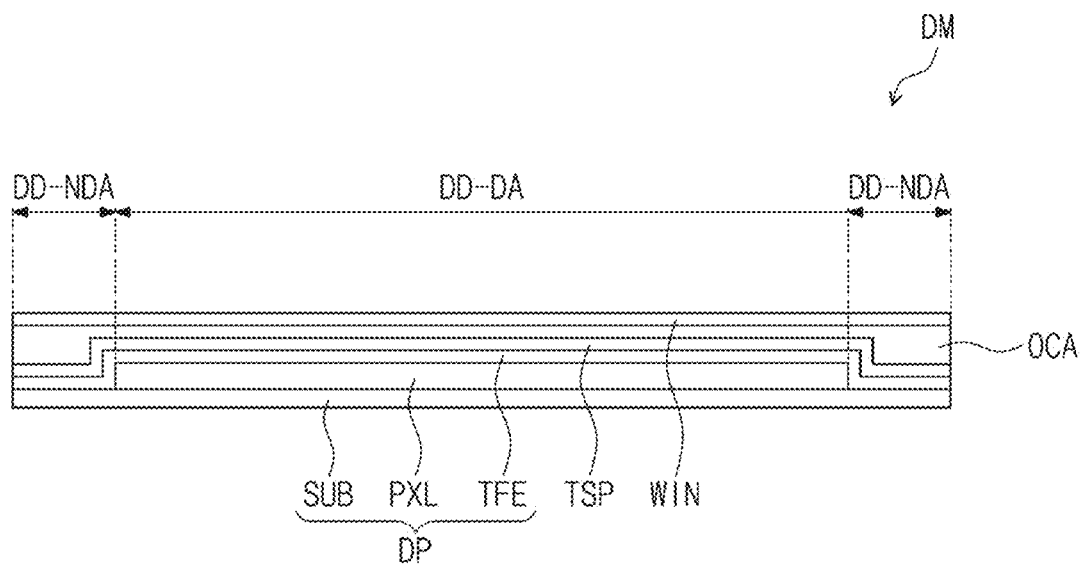
FIG. 3A is a cross-sectional view of an embodiment of a display module according to the invention.
Figure 3B:
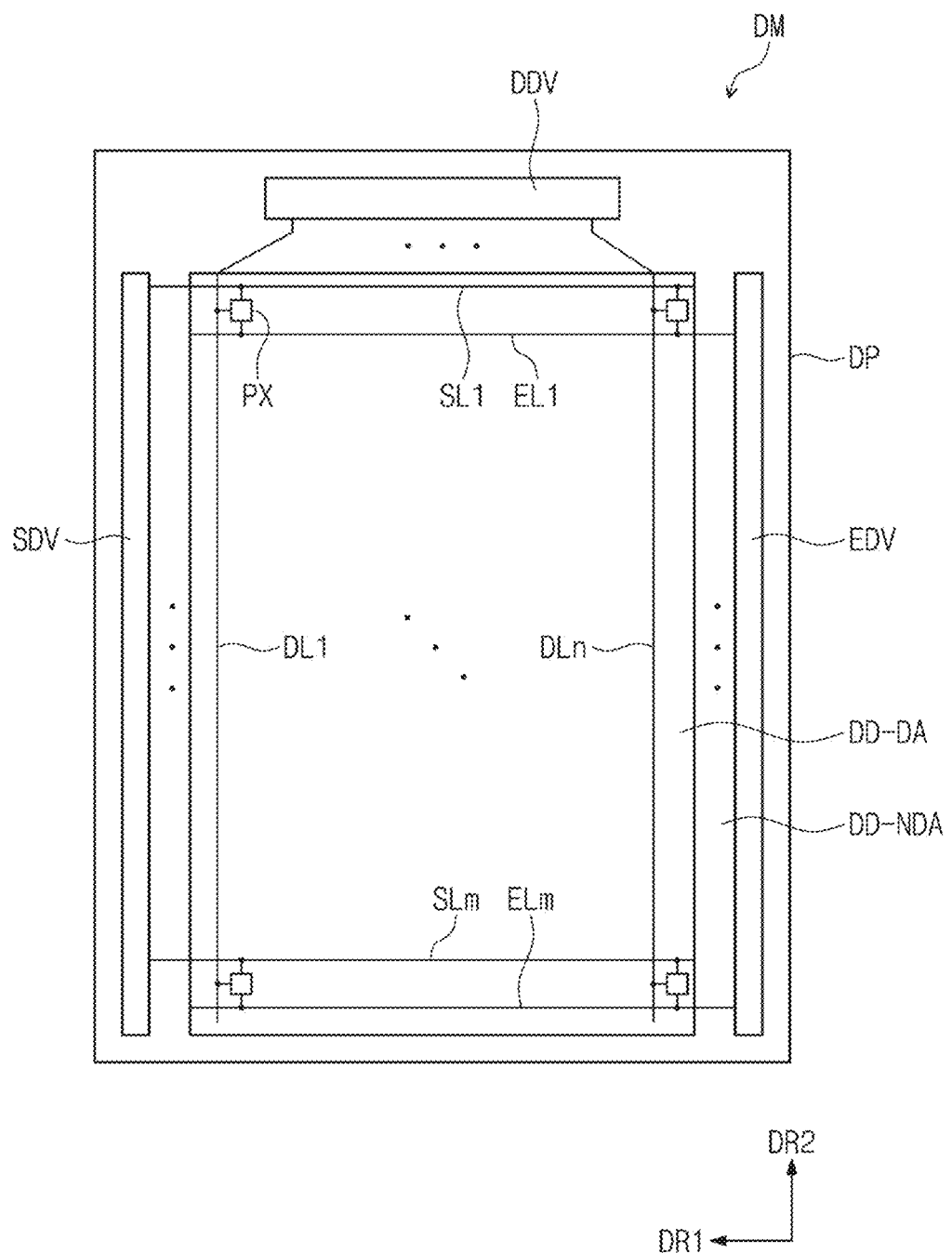
FIG. 3B is a plan view of an embodiment of a display module according to the invention.

FIG. 3A is a cross-sectional view of an embodiment of the display module DM in an embodiment of the invention, and FIG. 3B is a plan view of an embodiment of the display module DM according to the invention.

Referring to FIG. 3A, the display module DM may include a display panel DP, a touch sensing part TSP disposed on the display panel DP, a window WIN disposed on the touch sensing part TSP, and an adhesive OCA disposed between the touch sensing part TSP and the window WIN.

The display panel DP in an embodiment of the invention may be a liquid crystal display panel, an electrophoretic display panel, a microelectromechanical system ("MEMS") display panel, an electrowetting display panel, an organic light-emitting display panel, or an inorganic light-emitting display panel, however, it should not be limited thereto or thereby.

The display panel DP may include a base layer SUB, a pixel layer PXL disposed on the base layer SUB, and a thin film encapsulation layer TFE covering the pixel layer PXL. The base layer SUB may include a flexible plastic substrate. In an embodiment, the base layer SUB may include polyimide ("PI").

The base layer SUB may include a display area DD-DA and a non-display area DD-NDA around the display area DD-DA. The pixel layer PXL may be disposed on the display area DD-DA. The pixel layer PXL may include a plurality of pixels, and each pixel may include a light-emitting element.

The thin film encapsulation layer TFE may include at least two inorganic layers and an organic layer disposed between the inorganic layers. The inorganic layers may include an inorganic material and may protect the pixel layer PXL from moisture and oxygen. The organic layer may include an organic material and may protect the pixel layer PXL from a foreign substance, such as dust particles.

The touch sensing part TSP may sense an external input, e.g., a user's touch, may convert the sensed external input to a predetermined input signal, and may provide the input signal to the display panel DP. The touch sensing part TSP may include a plurality of touch sensor parts (not shown) to sense the external input. The touch sensor parts may sense the external input by a self-capacitance method or a mutual capacitance method. The display panel DP may receive the input signal from the touch sensing part TSP and may generate an image corresponding to the input signal.

The window WIN may protect the display panel DP and the touch sensing part TSP from external scratches and impacts. The window WIN may be attached to the touch sensing part TSP by the adhesive OCA. The adhesive OCA may include an optically clear adhesive. The image generated by the display panel DP may be provided to the user after passing through the window WIN.

Although not shown in drawing figures, a protective substrate or a cushion layer may be disposed under the display panel DP. The protective substrate may protect a lower portion of the display panel DP. The protective substrate may include a flexible plastic substrate. In an embodiment, the protective substrate may include polyethylene terephthalate ("PET").

The cushion layer may absorb external impacts applied to a lower portion of the display module DM to protect the display panel DP. The cushion layer may include a foam sheet having a predetermined elasticity.

Referring to FIG. 3B, the display module DM may include the display panel DP, a scan driver SDV, a data driver DDV, and an emission driver EDV. FIG. 3B shows a configuration of the display panel DP in a plan view, and the planar configuration of the touch sensing part TSP is omitted.

The display panel DP may be a flexible display panel. In an embodiment, the display panel DP may include a plurality of electronic elements arranged on a flexible substrate. The display panel DP may include the display area DD-DA and the non-display area DD-NDA surrounding the display area DD-DA. The display area DD-DA and the non-display area DD-NDA of the display panel DP may correspond to the display area DD-DA and the non-display area DD-NDA described earlier with reference to FIG. 3A.

The display panel DP may include a plurality of pixels PX, a plurality of scan lines SL1 to SLm, a plurality of data lines DL1 to DLn, and a plurality of emission lines EL1 to ELm. Each of m and n is a natural number. The pixels PX may be arranged in a matrix form, however, they should not be limited thereto or thereby. The pixels PX may be arranged in the display area DD-DA and may be connected to the scan lines SL1 to SLm, the data lines DL1 to DLn, and the emission lines EL1 to ELm.

The scan driver SDV, the data driver DDV, and the emission driver EDV may be arranged in the non-display area DD-NDA. The scan driver SDV and the emission driver EDV may be disposed adjacent to long sides of the display panel DP, respectively. The data driver DDV may be manufactured in the form of an integrated circuit chip and may be disposed adjacent to one side of short sides of the display panel DP.

The scan lines SL1 to SLm may extend in the first direction DR1 and may be connected to the scan driver SDV. The data lines DL1 to DLn may extend in the second direction DR2 and may be connected to the data driver DDV. The emission lines EL1 to ELm may extend in the first direction DR1 and may be connected to the emission driver EDV.

Although not shown in drawing figures, the display module DM may include a timing controller (not shown) to control an operation of the scan driver SDV, the data driver DDV, and the emission driver EDV.

The scan driver SDV may generate a plurality of scan signals in response to a scan control signal, and the scan signals may be sequentially applied to the pixels PX via the scan lines SL1 to SLm. The data driver DDV may receive image signals of which data format is converted and may generate data voltages corresponding to the image signals in response to a data control signal. The data voltages may be applied to the pixels PX via the data lines DL1 to DLn. The emission driver EDV may generate light-emitting signals in response to a light-emitting control signal, and the light-emitting signals may be applied to the pixels PX via the emission lines EL1 to ELm. The timing controller may generate the scan control signal, the data control signal, and the light-emitting control signal in response to control signals applied thereto from the outside.

The pixels PX may receive the data voltages in response to the scan signals. The pixels PX may emit light having luminance corresponding to the data voltages in response to the light-emitting signals to display the image. A light-emitting time of the pixels PX may be controlled by the light-emitting signals.

Figure 4A:
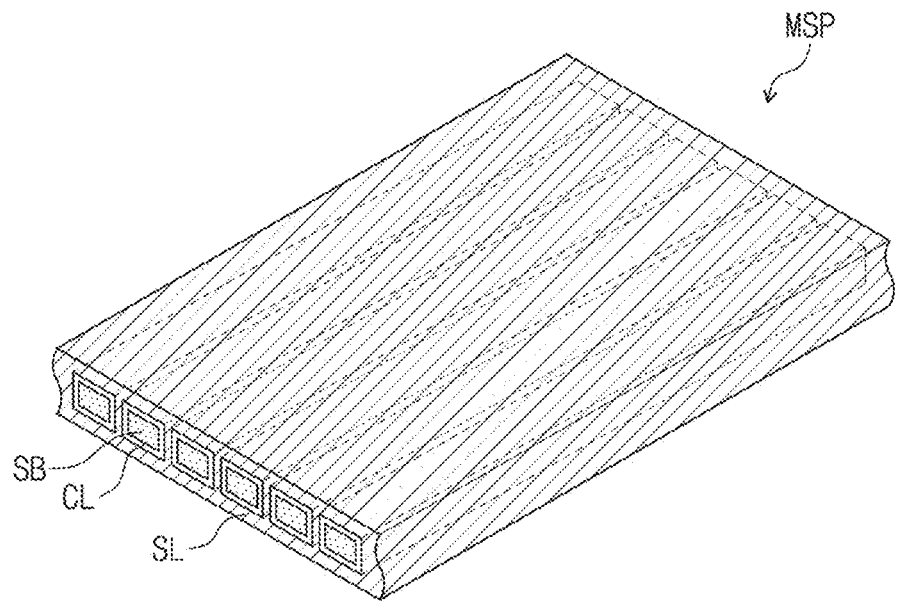
FIG. 4A is a perspective view of an embodiment of a portion of a module supporter according to the invention.
Figure 4B:
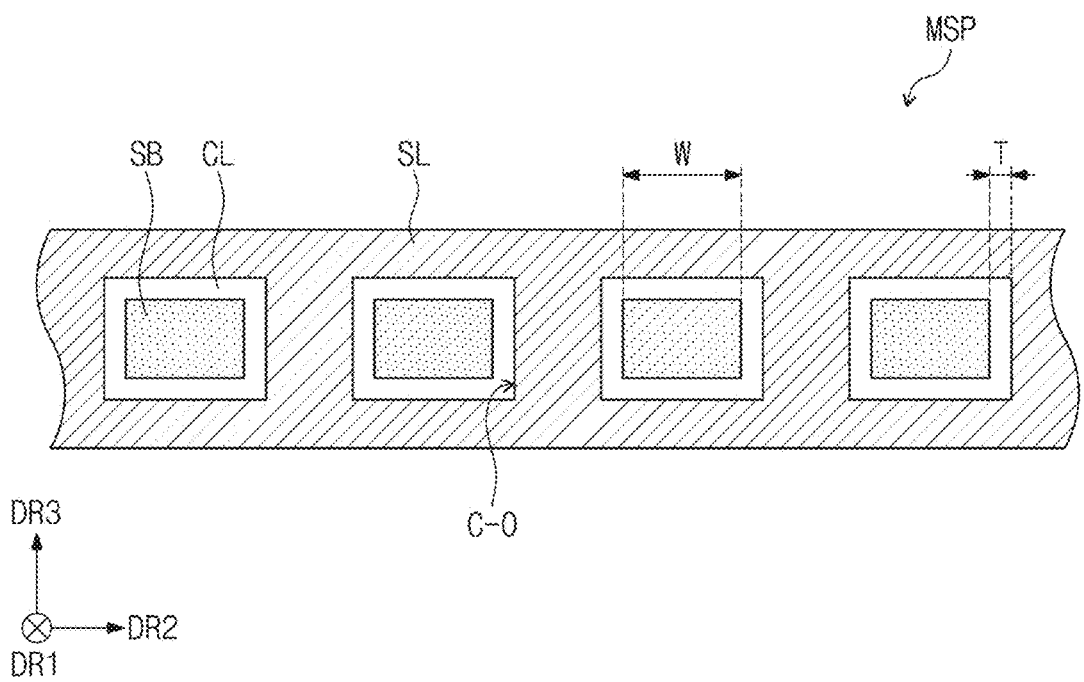
FIG. 4B is a cross-sectional view of an embodiment of a portion of a module supporter according to the invention.

FIG. 4A is a perspective view of an embodiment of a portion of the module supporter MSP in an embodiment of the invention, and FIG. 4B is a cross-sectional view of an embodiment of a portion of the module supporter MSP according to the invention. FIG. 4B shows a cross-section viewed in the first direction DR1.

Referring to FIGS. 4A and 4B, the module supporter MSP may include a support layer SL, coating layers CL, and support bars SB. The support layer SL may be attached to the rear surface DM-B of the display module DM described with reference to FIGS. 2A and 2B, and the coating layers CL and the support bars SB may be disposed in the support layer SL.

The coating layers CL may extend in the first direction DR1 and may be arranged spaced apart from each other in the second direction DR2 in the support layer SL. Four surfaces of each of the coating layers CL extending in the first direction DR1 may be covered by the support layer SL. Surfaces of the coating layers CL, which contact the support layer SL, may be defined as an outer surface C-O.

Each of the support bars SB may be disposed in a corresponding coating layer among the coating layers CL. That is, one support bar may be disposed in one coating layer. The support bars SB may extend in the first direction DR1 and may be arranged in the second direction DR2. Four surface of each of the support bars SB extending in the first direction DR1 may be covered by a corresponding coating layer.

Opposite ends of the coating layers CL, which are opposite to each other in the first direction DR1, may not be disposed in the support layer SL and may be exposed to the outside of the support layer SL. Opposite ends of the support bars SB, which are opposite to each other in the first direction DR1, may not be disposed in a corresponding coating layer among the coating layers CL and may be exposed to the outside of the coating layer, however, it should not be limited thereto or thereby. In an embodiment, the opposite ends of the support bars SB may be covered by the coating layers CL without being exposed to the outside. In addition, the opposite ends of the coating layers CL may be covered by the support layer SL without being exposed to the outside.

FIGS. 4A and 4B show the support bars SB each having a quadrangular (e.g., rectangular) shape in a cross-section as an illustrative embodiment. Accordingly, the outer surface C-O of each of the coating layers CL respectively covering the support bars SB may also have a rectangular shape. However, the shape of the support bars SB and the outer surface C-O of the coating layers CL in a cross-section should not be limited thereto or thereby. In an embodiment, the support bars SB and the outer surface C-O of the coating layers CL may have a square shape. In addition, the support bars SB and the outer surface C-O of the coating layers CL may have a variety of shapes rather than a quadrangular shape, e.g., the rectangular shape, the square shape, or the like, and details thereof will be described later.

In the illustrated embodiment, the coating layers CL may have a modulus greater than a modulus of the support layer SL and smaller than a modulus of the support bars SB. That is, according to the invention, components included in the module supporter MSP may have moduli different from each other.

In an embodiment, the support layer SL may have the modulus equal to or greater than about 10 kilopascals (KPa) and equal to or smaller than about 100 KPa. The support bars SB may have the modulus equal to or greater than about 50 gigapascals (GPa) and equal to or smaller than about 500 GPa. The coating layers CL may have the modulus equal to or greater than about 100 megapascals (MPa) and equal to or smaller than about 10 GPa.

The support bars SB may be a rigid type. In an embodiment, the support bars SB may include a metal material or a carbon fiber. The support bars SB may include aluminum, stainless steel, invar, or carbon fiber reinforced plastic ("CFRP"). In addition, the support bars SB may include a metal material that sticks to a magnet.

The support layer SL may include a polymer material. In an embodiment, the support layer SL may include an elastomer with a predetermined elasticity. The elastomer may include at least one of thermoplastic polyurethane ("TPU"), silicone, thermoplastic rubber ("TPR"), elastolefin, thermoplastic olefin ("TPO"), polyamide ("PA"), polyether block amide ("PEBA"), synthetic polyisoprene, polybutadiene, chloroprene rubber ("CR"), butyl rubber, styrene-butadiene ("SB"), epichlorohydrin rubber ("ER"), polyacrylic rubber, silicone rubber, fluorosilicone rubber, fluoroelastomer, and ethylene-vinyl acetate ("EVA").

The coating layers CL may include a polymer material. In an embodiment, the coating layers CL may include polyimide ("PI"), polyethylene terephthalate ("PET"), polycarbonate ("PC"), or polyamide ("PA"). However, the material for the coating layers CL should not be limited thereto or thereby as long as the material for the coating layers CL includes a polymer.

In the illustrated embodiment, the support bars SB including metal rods may support the display panel DP (refer to FIG. 3A) in the second mode. The support bars SB may extend along the first direction DR1 coincident with the rolling axis of the display module DM and may be arranged to be spaced apart from each other in the second direction DR2, and thus, the display module DM may be rolled in the second direction DR2.

Different from the illustrated embodiment, in a case where the support layer having a modulus smaller than that of the support bars directly covers the support bars, the strain occurring during the rolling may be concentrated on the support layer as a difference in modulus between the support bars and the support layer increases, and thus, the strain occurring in the support bars may decrease. In this case, however, a maximum value of the strain occurring in the support layer may increase, and the support layer may be cracked or deformed. As a result, the surface quality of the support layer may be deteriorated.

According to the disclosure, as the coating layers CL having the modulus greater than that of the support layer SL and smaller than that of the support bars SB is disposed in the support layer SL to cover the support bars SB, the coating layers CL may absorb the strain occurring in the support bars SB. When the difference in modulus between the components of the module supporter MSP decreases, the strain occurring in the support bars SB may decrease, and the maximum value of the strain occurring in the support layer SL may be reduced. As described above, the support layer SL and the support bars SB may be prevented from being deformed, and thus, the surface quality of the display device DD (refer to FIG. 2B) may be improved.

In addition, as the value of the strain occurring in the support layer SL is reduced, a rigidity of the module supporter MSP may be enhanced by the support layer SL. Accordingly, the display module DM and the module supporter MSP of the display device DD may be rolled at a low curvature.

In particular, as the modulus of the coating layers CL approaches a median value of a sum of the modulus of the support layer SL and the modulus of the support bars SB, an amount of reduction in the maximum value of the strain occurring in the support layer SL may increase by arranging the coating layers CL. That is, when the modulus of the coating layers CL has the median value of the sum of the modulus of the support layer SL and the modulus of the support bars SB, the value of the strain occurring in the support layer SL may be minimized.

In an embodiment, in the case where the support bars SB include the metal material, the support bars SB may include an inorganic material, the support layer SL may include an organic material, and thus, an adhesion between the support bars SB and the support layer SL may be insufficient. Accordingly, when the support bars SB are disposed in the support layer SL without the coating layers CL, an interfacial delamination may occur between the support bars SB and the support layer SL. In the illustrated embodiment, the support bars SB may be coated with the coating layers CL including the polymer material, and the adhesion between the coating layers CL including the organic material and the support layer SL including the organic material may increase. Therefore, the interfacial delamination may be prevented from occurring between the components of the module supporter MSP.

In the illustrated embodiment, each of the support bars SB may have a width W equal to or greater than about 0.4 millimeters (mm) and equal to or smaller than about 0.8 mm in the second direction DR2 in the cross-section. In a case where the width W of each of the support bars SB is smaller than about 0.4 mm, support characteristics of the support bars SB for the display module DM may not be sufficiently exhibited. In a case where the width W of each of the support bars SB is greater than about 0.8 mm, a large strain may occur in the support bars SB when the support bars SB are rolled with the low curvature, and as a result, there may be a limit to the curvature of the display device DD when the display device DD is rolled.

In the illustrated embodiment, each of the coating layers CL may have a thickness T equal to or smaller than about 200 micrometers (μm) in the cross-section. Since the coating layers CL may be formed by a solution coating method, in a case where the thickness T of each of the coating layers CL is greater than about 200 μm, it is difficult to coat the coating layers CL to a desired thickness T. When the coating layers are formed by immersing the coating layers in a coating solution for a predetermined period of time and then drying the coating layers after taking them out of the coating solution in an embodiment of the solution coating method, the immersing process may be desired to be performed several times to coat the coating layers CL thickly, an economic feasibility of manufacturing the coating layers CL may decrease, and a precision to control the thickness of the coating layers CL may be lowered.

FIGS. 4A and 4B show a structure in which each of the coating layers CL and the support bars SB are arranged at regular intervals in the second direction DR2 as an illustrative embodiment, however, it should not be limited thereto or thereby. In an embodiment, intervals between the coating layers CL and between the support bars SB may be changed.

Figure 5A:
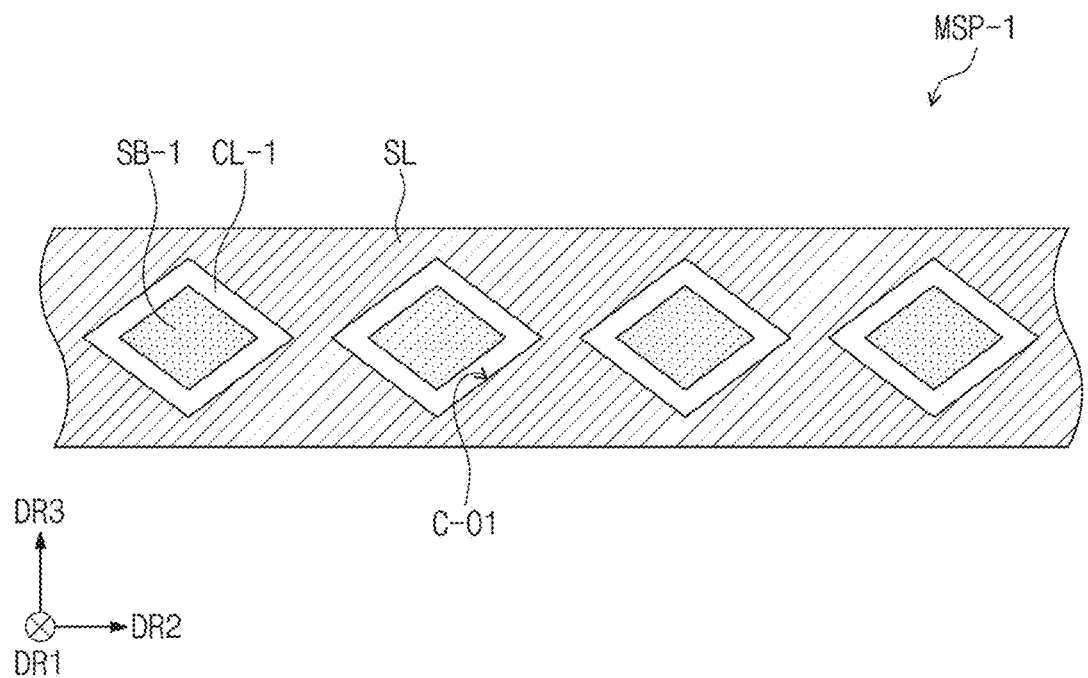
FIG. 5A is a cross-sectional view of an embodiment of a portion of a module supporter according to the invention.
Figure 5B:
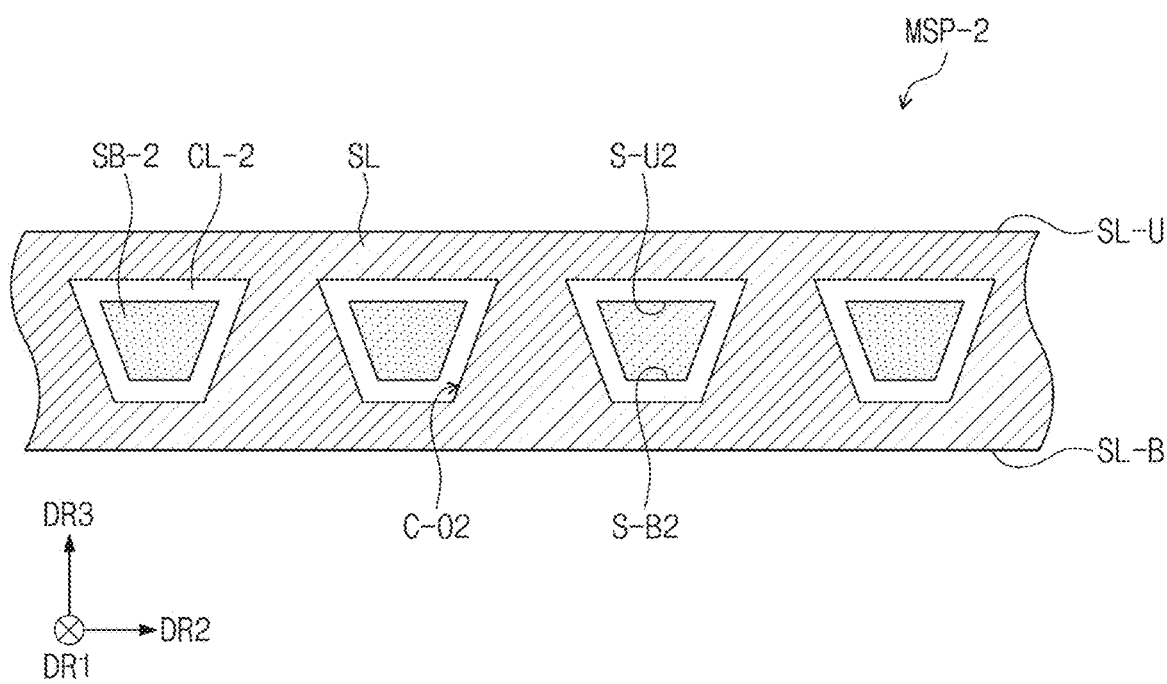
FIG. 5B is a cross-sectional view of an embodiment of a portion of a module supporter according to the invention.
Figure 5C:
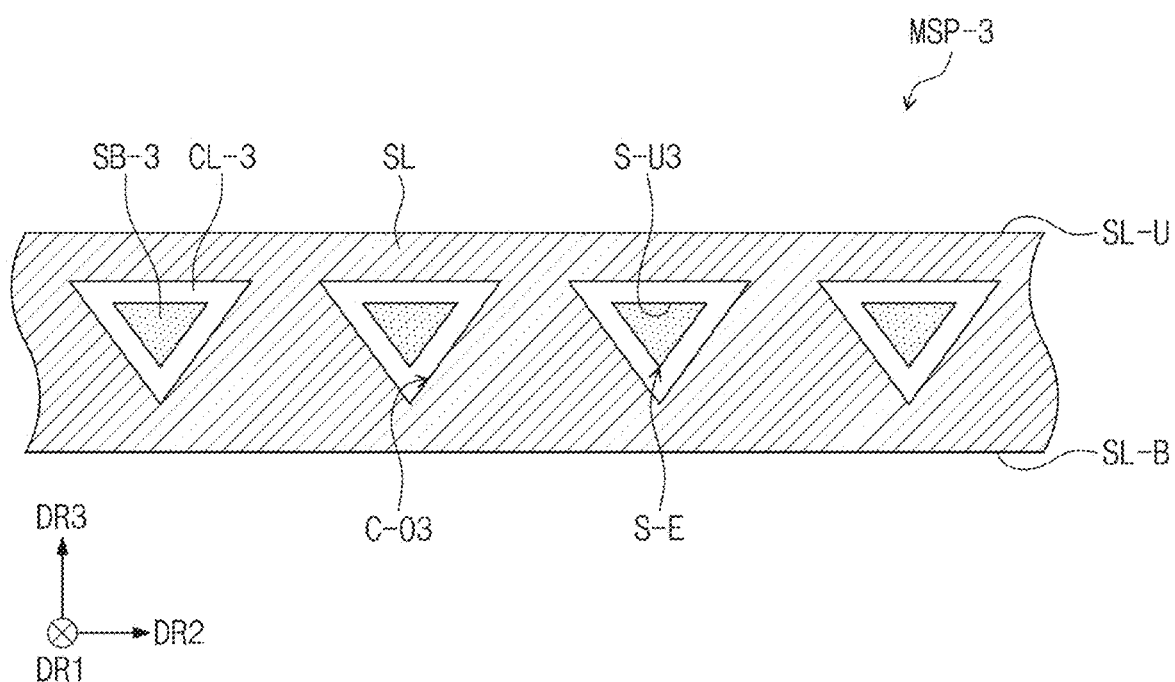
FIG. 5C is a cross-sectional view of an embodiment of a portion of a module supporter according to the invention.
Figure 5D:
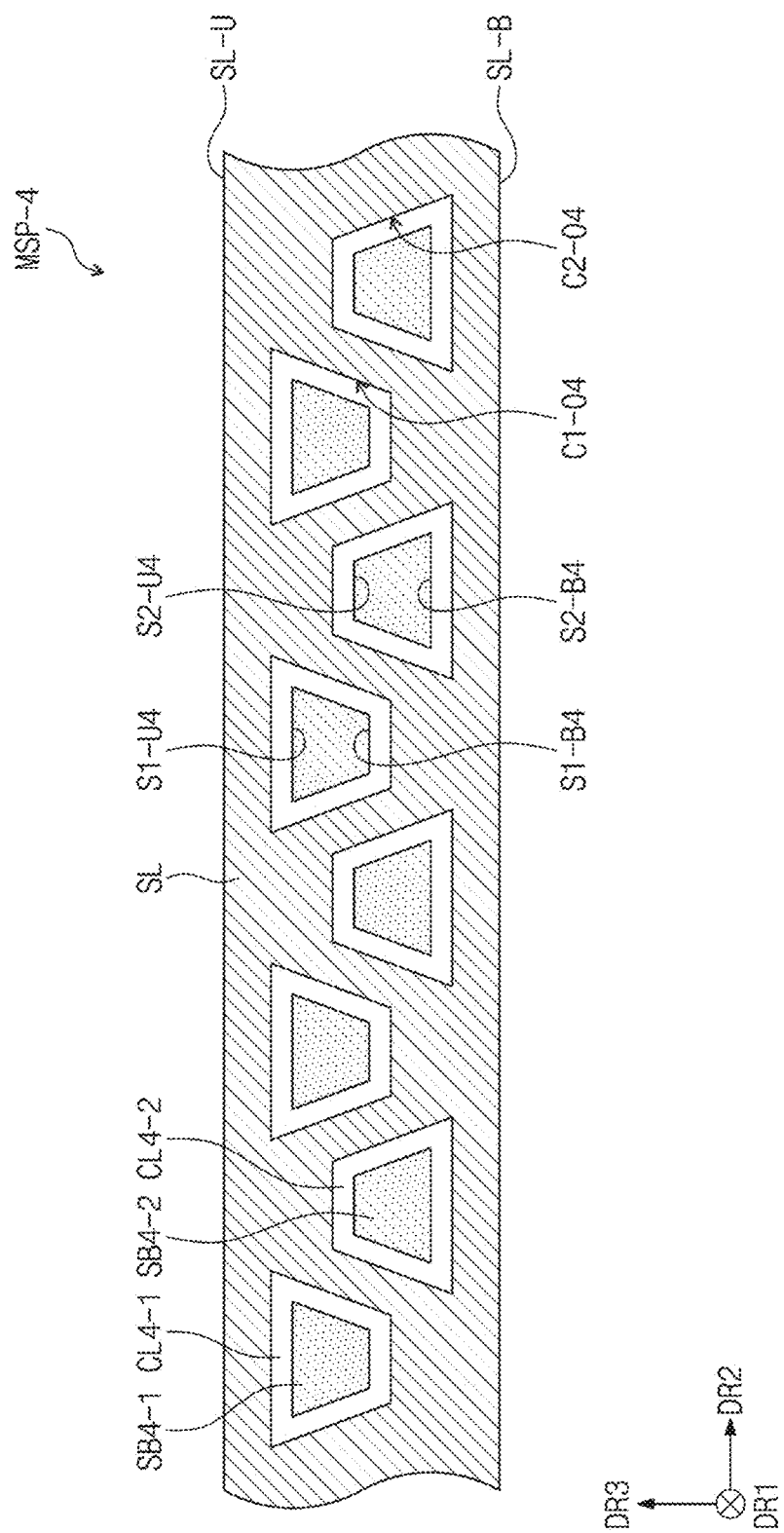
FIG. 5D is a cross-sectional view of an embodiment of a portion of a module supporter according to the invention.
Figure 5E:
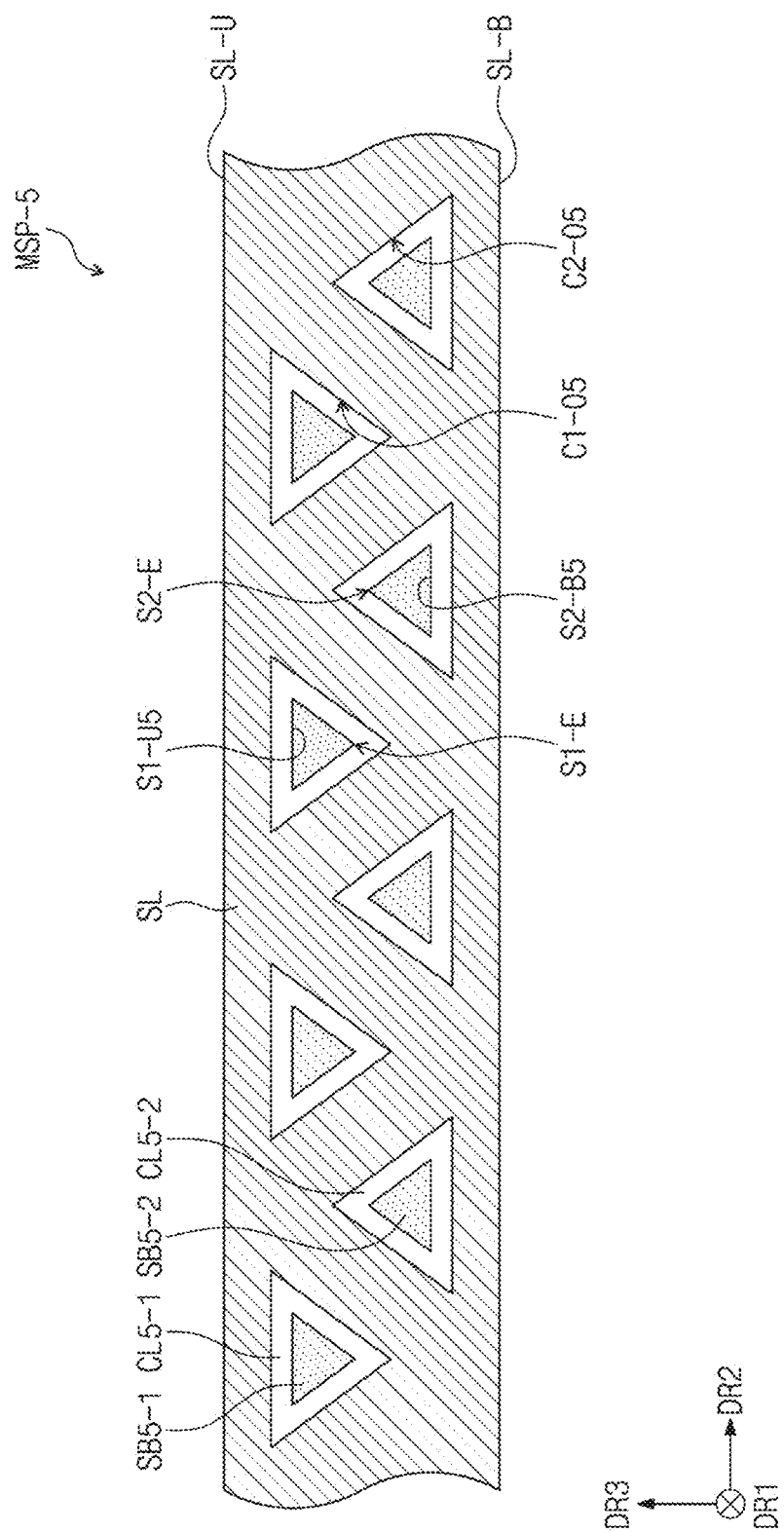
FIG. 5E is a cross-sectional view of an embodiment of a portion of a module supporter according to the invention.

FIG. 5A is a cross-sectional view of an embodiment of a portion of a module supporter MSP-1 according to the invention. FIG. 5B is a cross-sectional view of an embodiment of a portion of a module supporter MSP-2 according to the invention. FIG. 5C is a cross-sectional view of an embodiment of a portion of a module supporter MSP-3 according to the invention. FIG. 5D is a cross-sectional view of an embodiment of a portion of a module supporter MSP-4 according to the invention. FIG. 5E is a cross-sectional view of an embodiment of a portion of a module supporter MSP-5 according to the invention.

FIGS. 5A to 5E are cross-sectional views of portions of the module supporters MSP-1, MSP-2, MSP-3, MSP-4, and MSP-5, respectively, in the first direction DR1. In addition, the support layer SL shown in FIGS. 5A to 5E is the same as the support layer SL of the module supporter MSP shown in FIG. 4B, and thus, is assigned with the same reference numeral as that of the support layer SL of the module supporter MSP shown in FIG. 4B.

Referring to FIG. 5A, the module supporter MSP-1 may include a support layer SL, support bars SB-1 disposed in the support layer SL, and coating layers CL-1 disposed in the support layer SL. Each of the coating layers CL-1 may surround a corresponding support bar among the support bars SB-1.

The support bars SB-1 may have a rhombus (or lozenge) shape in a cross-section. As each of the coating layers CL-1 surrounds the corresponding support bar among the support bars SB-1, each of the coating layers CL-1 may include an outer surface C-O1 having the rhombus shape corresponding to the shape of the support bars SB-1 in the cross-section.

Referring to FIG. 5B, the module supporter MSP-2 may include a support layer SL, support bars SB-2 disposed in the support layer SL, and coating layers CL-2 disposed in the support layer SL. Each of the coating layers CL-2 may surround a corresponding support bar among the support bars SB-2.

The support bars SB-2 may have an inverse trapezoidal shape in a cross-section. As each of the coating layers CL-2 surrounds a corresponding support bar among the support bars SB-2, each of the coating layers CL-2 may include an outer surface C-O2 having the inverse trapezoidal shape corresponding to the shape of the support bars SB-2 in the cross-section.

In an embodiment, the support layer SL may include an upper surface SL-U attached to the rear surface DM-B (refer to FIGS. 2A and 2B) of the display module DM (refer to FIGS. 2A and 2B) and a lower surface SL-B opposite to the upper surface SL-U. Each of the support bars SB-2 may include a first surface S-U2 adjacent to the upper surface SL-U of the support layer SL and a second surface S-B2 adjacent to the lower surface SL-B of the support layer SL. In the cross-section, the first surface S-U2 may have a side longer than that of the second surface S-B2.

Referring to FIG. 5C, the module supporter MSP-3 may include a support layer SL, support bars SB-3 disposed in the support layer SL, and coating layers CL-3 disposed in the support layer SL. Each of the coating layers CL-3 may surround a corresponding support bar among the support bars SB-3.

Each of the support bars SB-3 may have an inverse triangular shape in a cross-section. As each of the coating layers CL-3 covers a corresponding support bar among the support bars SB-3, each of the coating layers CL-3 may include an outer surface C-O3 having the inverse triangular shape corresponding to the shape of the support bars SB-3 in the cross-section.

In an embodiment, in the cross-section, an upper surface S-U3 of each of the support bars SB-3 may be closer to an upper surface SL-U of the support layer SL than to a lower surface SL-B of the support layer SL. A vertex S-E of each of the support bars SB-3 may be disposed at a position lower than the upper surface S-U3 of the support bars SB-3 in a direction toward the lower surface SL-B of the support layer SL from the upper surface S-U3 of each of the support bars SB-3 in the cross-section.

However, the shapes of the support bars SB, SB-1, SB-2, and SB-3 shown in FIGS. 4B and 5A to 5C are merely some of embodiments, and the support bars SB, SB-1, SB-2, and SB-3 may have a variety of shapes, e.g., a circular shape, a polygonal shape, etc.

Referring to FIG. 5D, support bars SB4-1 and SB4-2 may include first support bars SB4-1 and second support bars SB4-2. The first support bars SB4-1 may extend in the first direction DR1 and may be arranged in the second direction DR2. The second support bars SB4-2 may extend in the first direction DR1 and may be arranged in the second direction DR2. The first support bars SB4-1 may be alternately arranged with the second support bars SB4-2.

In the first direction DR1, the first support bars SB4-1 and the second support bars SB4-2 may have a shape symmetrical to each other based on the second direction DR2. In an embodiment, the first support bars SB4-1 may have an inverse trapezoidal shape, and the second support bars SB4-2 may have a trapezoidal shape.

A support layer SL may include an upper surface SL-U attached to the rear surface DM-B (refer to FIGS. 2A and 2B) of the display module DM (refer to FIGS. 2A and 2B) and a lower surface SL-B opposite to the upper surface SL-U. In the illustrated embodiment, the first support bars SB4-1 may be closer to the upper surface SL-U of the support layer SL than the second support bars SB4-2 are. The second support bars SB4-2 may be closer to the lower surface SL-B of the support layer SL than the first support bars SB4-1 are.

In an embodiment, an upper surface S1-U4 of each of the first support bars SB4-1 may be closer to the upper surface SL-U of the support layer SL than an upper surface S2-U4 of each of the second support bars SB4-2 is, and a lower surface S2-B4 of each of the second support bars SB4-2 may be closer to the lower surface SL-B of the support layer SL than a lower surface S1-B4 of each of the first support bars SB4-1 is.

Coating layers CL4-1 and CL4-2 may include first coating layers CL4-1 respectively surrounding the first support bars SB4-1 and second coating layers CL4-2 respectively surrounding the second support bars SB4-2. An outer surface C1-O4 of each of the first coating layers CL4-1 may have an inverse trapezoidal shape, and an outer surface C2-O4 of each of the second coating layers CL4-2 may have a trapezoidal shape.

Referring to FIG. 5E, support bars SB5-1 and SB5-2 may include first support bars SB5-1 and second support bars SB5-2 alternately arranged with the first support bars SB5-1. In FIG. 5E, the same reference numerals denote the same elements in FIG. 5D, and thus, detailed descriptions of the same elements will be omitted.

In a cross-section, the first support bars SB5-1 may have an inverse triangular shape, and the second support bars SB5-2 may have a triangular shape. In the illustrated embodiment, the first support bars SB5-1 may be closer to an upper surface SL-U of a support layer SL than the second support bars SB5-2 are. The second support bars SB5-2 may be closer to a lower surface SL-B of the support layer SL than the first support bars SB5-1 are.

In an embodiment, an upper surface S1-U5 of each of the first support bars SB5-1 may be closer to the upper surface SL-U of each of the support layer SL than a vertex S2-E of the second support bars SB5-2 is. A lower surface S2-B5 of each of the second support bars SB5-2 may be closer to the lower surface SL-B of the support layer SL than a vertex S1-E of the first support bars SB5-1 is.

Coating layers CL5-1 and CL5-2 may include first coating layers CL5-1 respectively surrounding the first support bars SB5-1 and second coating layers CL5-2 respectively surrounding the second support bars SB5-2. An outer surface C1-O5 of each of the first coating layers CL5-1 may have an inverse triangular shape, and an outer surface C2-C5 of each of the second coating layers CL5-2 may have a triangular shape.

Figure 6:
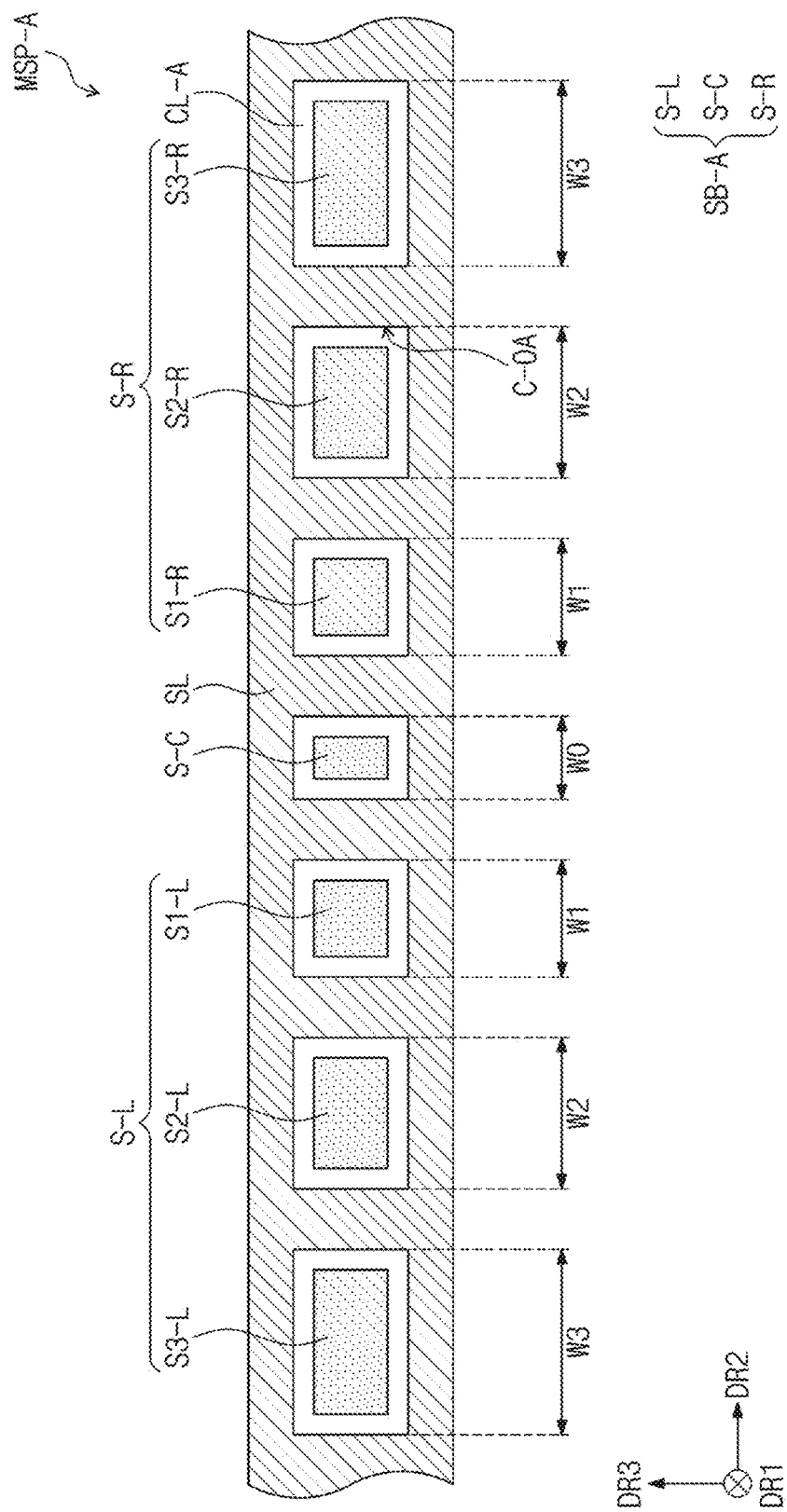
FIG. 6 is a cross-sectional view of a portion of an embodiment of a module supporter according to the invention.
Figure 7A:
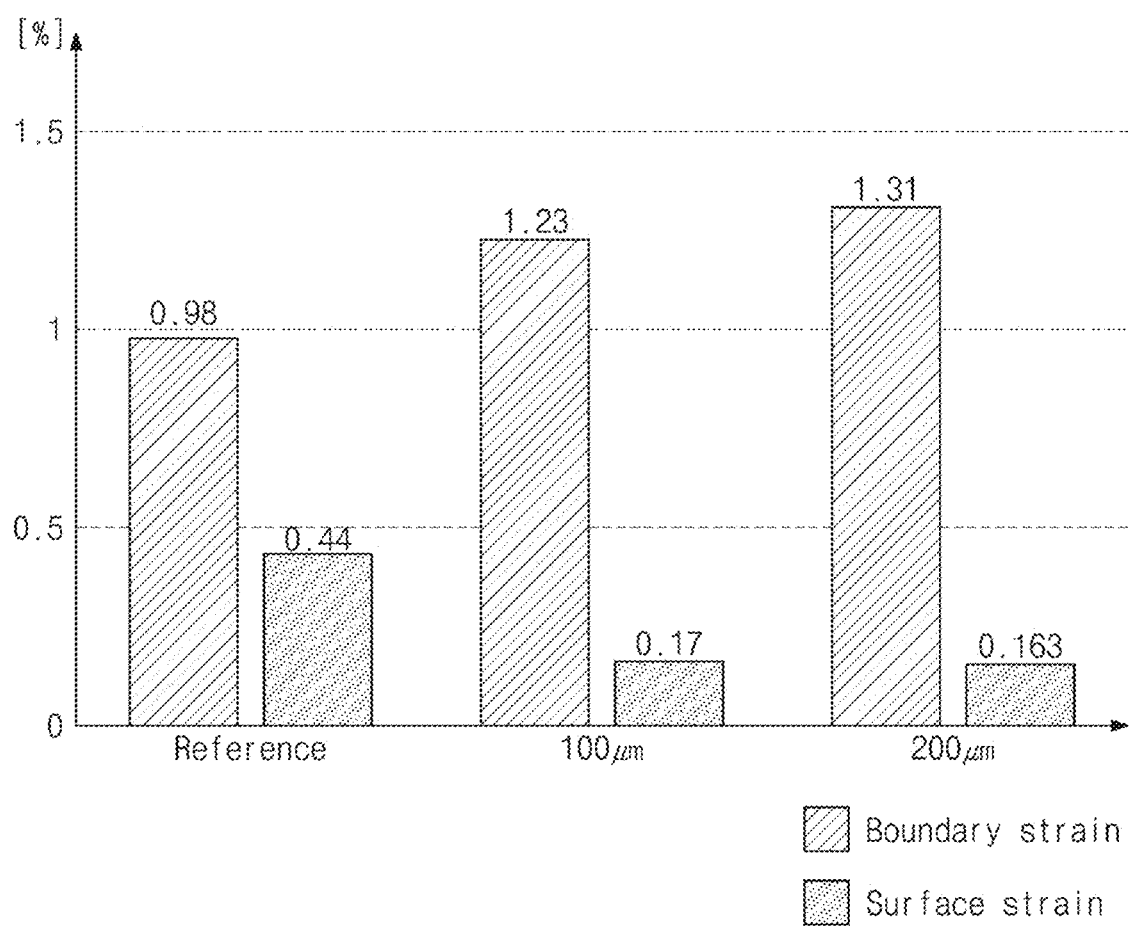
FIGS. 7A to 7C are graphs of values of an embodiment of a strain occurring in a module supporter according to the invention.
Figure 7B:
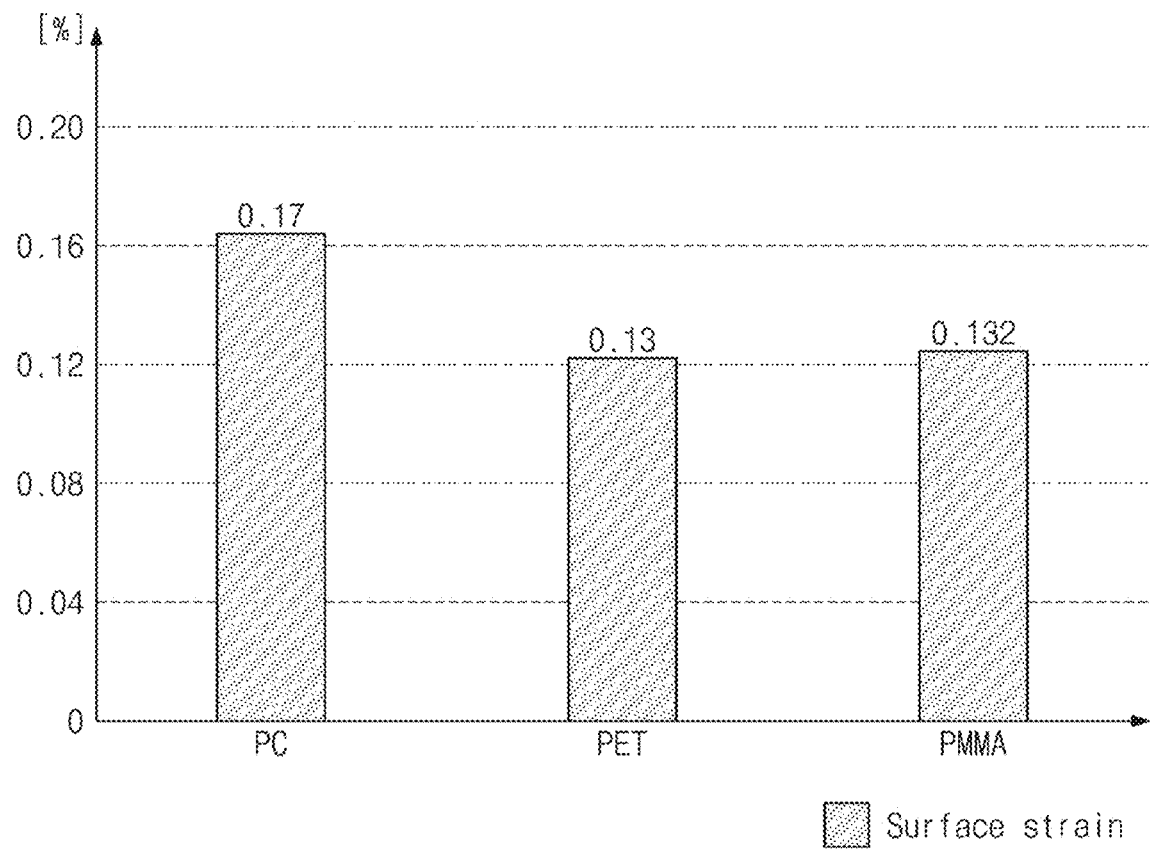
Figure 7C:
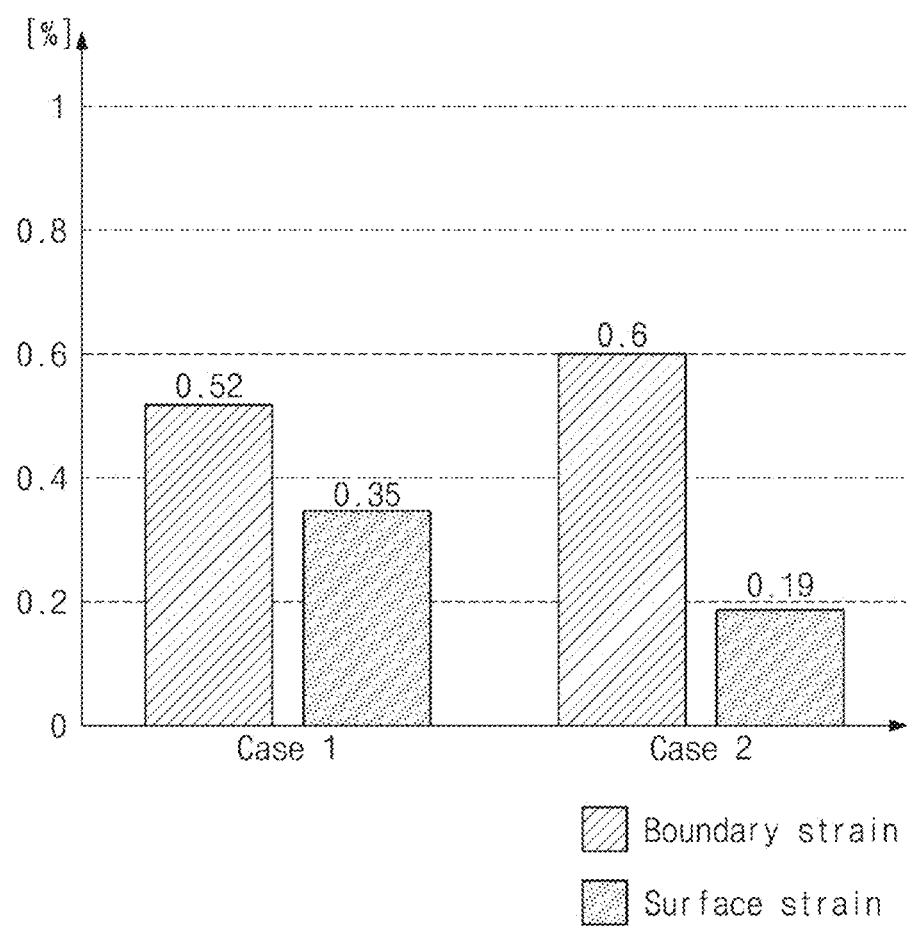

FIG. 6 is a cross-sectional view of an embodiment of a portion of a module supporter MSP-A according to the invention, and FIGS. 7A to 7C are graphs of an embodiment of values of a strain occurring in a module supporter according to the invention.

Referring to FIG. 6, the module supporter MSP-A may include support bars SB-A having different widths in the second direction DR2. The support bars SB-A may include a center support bar S-C, left support bars S-L, and right support bars S-R.

The center support bar S-C may be disposed at a center of the module supporter MSP-A before the display module DM (refer to FIGS. 2A and 2B) is rolled. The left support bars S-L and the right support bars S-R may be disposed spaced apart from each other with respect to the center support bar S-C in the second direction DR2.

The left support bars S-L may include a first support bar S1-L, a second support bar S2-L, and a third support bar S3-L, and the right support bars S-R may include a first support bar S1-R, a second support bar S2-R, and a third support bar S3-R. The first, second, and third support bars S1-L, S2-L, and S3-L included in the left support bars S-L may be sequentially arranged from a left end of the center support bar S-C along a direction away from the left end of the center support bar S-C and may be spaced apart from each other. The first, second, and third support bars S1-R, S2-R, and S3-R included in the right support bars S-R may be sequentially arranged from a right end of the center support bar S-C along a direction away from the right end of the center support bar S-C and may be spaced apart from each other.

In an embodiment, the left support bars S-L and the right support bars S-R may be symmetrical with each other with respect to the center support bar S-C in the second direction DR2, however, they should not be limited thereto or thereby. In an embodiment, two center support bars S-C spaced apart from each other may be disposed parallel to each other in the second direction DR2. In this case, the center support bar S-C disposed at the left side and the left support bars S-L may be symmetrical with the center support bar S-C disposed at the right side and the right support bars S-R with respect to the second direction DR2.

In the second direction DR2, the center support bar S-C may have a minimum width W0, and each of the first support bars S1-L and S1-R may have a first width W1. Each of the second support bars S2-L and S2-R may have a second width W2, and each of the third support bars S3-L and S3-R may have a third width W3.

In an embodiment, the minimum width W0 and the first, second, and third widths W1, W2, and W3 may have different values from each other. In an embodiment, the first width W1 may be greater than the minimum width W0, the second width W2 may be greater than the first width W1, and the third width W3 may be greater than the second width W2. That is, a width in the second direction DR2 of the support bars SB-A may gradually increase from a center portion of the module supporter MSP-A to opposite ends of the module supporter MSP-A.

When the display module DM is rolled, the value of the strain occurring in the module supporter MSP-A may increase from the opposite ends of the module supporter MSP-A to the center of the module supporter MSP-A. In the illustrated embodiment, since the support bar having a small width is disposed at the center where the value of the strain is relatively large, the value of the strain occurring in the center of the module supporter MSP-A may be reduced.

FIG. 6 shows the support bars SB-A each having a quadrangular (e.g., rectangular) shape in the cross-section as an illustrative embodiment, however, it should not be limited thereto or thereby. A structure in which the width of the support bars decreases as a distance from the center of the module supporter MSP-A is reduced may be applied to the support bars SB-1, SB-2, SB-3, SB4-1, SB4-2, SB5-1, and SB5-2 respectively having the shapes shown in FIGS. 5A to 5E.

FIG. 6 shows a structure in which each of the left support bars S-L and the right support bars S-R include three support bars, however, the number of each of the left support bars S-L and the right support bars S-R should not be limited to three.

In the illustrated embodiment, each of the support bars SB-A having different widths from each other may be disposed in a corresponding coating layer among coating layers CL-A. That is, one support bar may be disposed in one coating layer. The coating layers CL-A may include an outer surface C-OA having a quadrangular (e.g., rectangular) shape corresponding to the shape of the support bars SB-A in the cross-section, and a width in the second direction DR2 of the outer surface C-OA may decrease from the end of the module supporter MSP-A to the center of the module supporter MSP-A.

The coating layers CL-A may have a modulus greater than that of the support layer SL and smaller than that of the support bars SB-A. Due to the coating layers CL-A, the difference in modulus between the components of the module supporter may be reduced, and the maximum value of the strain occurring in the support layer SL may be reduced. Accordingly, the surface quality of the display device DD (refer to FIG. 1) may be improved.

FIGS. 7A and 7B are graphs of an embodiment of values of the strain occurring in the module supporter according to the invention. The graphs of FIG. 7A show the value of the strain according to the thickness T (refer to FIG. 4B) of the coating layer CL (refer to FIG. 4B), and the graphs of FIG. 7B show the value of the strain according to a material included in the coating layer CL (refer to FIG. 4B). The value of the strain is expressed as a ratio of a length increased or decreased with respect to an original length when an object is tensioned or compressed, and FIGS. 7A and 7B show the ratio as a percentage. FIGS. 7A and 7B are graphs showing results of bending simulation of the module supporter MSP described in FIG. 4B.

FIG. 7A shows the values of the strain occurring in a portion of the module supporter MSP when the bending simulation is performed by varying the thickness T of the coating layer CL. A boundary strain means a maximum value of the strain occurring at a boundary between the support layer SL (refer to FIG. 4B) and the coating layers CL. A surface strain means a maximum value of the strain occurring in the support layer SL and means the value of the strain occurring in a lower surface of the support layer SL curved at the greatest curvature when the support layer SL is bent.

In the simulation, the coating layer CL including polycarbonate ("PC") is used, and the value of strain generated in the module supporter MSL is measured when the coating layer CL is not included (hereinafter, also referred to as a reference) and when the coating layer CL is arranged with the thickness T of about 100 μm and about 200 μm.

Referring to FIG. 7A, the boundary strain occurring in the reference is about 0.98%, and the surface strain occurring in the reference is about 0.44%. Since the reference is a case where the coating layer is not included, the boundary strain means the maximum value of the strain occurring at the boundary between the support layer SL and the support bars SB. When the thickness T of the coating layer CL is about 100 μm, the boundary strain is about 1.23%, and the surface strain is about 0.17%. When the thickness T of the coating layer CL is about 200 μm, the boundary strain is about 1.31%, and the surface strain is about 0.163%.

When the results in the case where the coating layer CL is not included and the results in the case where the coating layer CL is included are compared with each other, the boundary strain is relatively large, and the surface strain is relatively small when the coating layer CL is included. As described above, it is observed that the strain occurring near the boundary between the support bars SB and the support layer SL is absorbed more in the case where the coating layer CL is included than in the case where the coating layer CL is not included, and thus, the maximum value of the strain occurring in the support layer SL may be reduced. That is, when the coating layer CL is disposed between the support bars SB and the support layer SL, the value of the strain occurring in the support layer SL may be reduced.

When the results in the case where the coating layer CL having the thickness of about 100 μm is included and the results in the case where the coating layer CL having the thickness of about 200 μm is included are compared with each other, the boundary strain is relatively large and the surface strain is relatively small when the coating layer CL having the thickness of about 200 μm is included. As described above, as the thickness of the coating layer CL increases, the strain occurring near the boundary of the support bars SB may be more absorbed, and consequently, the maximum value of the strain occurring in the support layer SL may be reduced. That is, as the thickness of the coating layer CL increases, the effect of reducing the value of the strain occurring in the support layer SL becomes high.

FIG. 7B shows the values of the strain occurring in the support layer SL of the module supporter MSP when the bending simulation is performed by varying the material of the coating layer CL. The meaning of the surface strain in FIG. 7B is the same as that of FIG. 7A.

The coating layers CL of the simulation include polycarbonate (hereinafter, also referred to as a PC), polyethylene terephthalate (hereinafter, also referred to as a PET), polymethyl methacrylate (hereinafter, also referred to as a PMMA), respectively. In addition, the coating layers CL of the simulation may have the thickness of about 100 μm.

The coating layer CL including the PC has a modulus of about 2.0 GPa, the coating layer CL including the PET has a modulus of about 2.5 GPa, and the coating layer CL including the PMMA has a modulus of about 3.0 GPa. That is, in the simulation, the values of the strain occurring in the support layer SL according to the modulus of the coating layer CL are measured.

Referring to FIG. 7B, the surface strain occurring when the coating layer CL includes the PC, i.e., when the coating layer CL has the modulus of about 2.0 GPa, is about 0.17%. The surface strain occurring when the coating layer CL includes the PET, i.e., when the coating layer CL has the modulus of about 2.5 GPa, is about 0.13%. The surface strain when the coating layer CL includes the PMMA, i.e., when the coating layer CL has the modulus of about 3.0 GPa, is about 0.132%.

When the modulus of the coating layer CL is about 2.5 GPa, the value of the surface strain occurring in the support layer SL is smaller than that when the modulus of the coating layer CL is about 2.0 GPa. When the modulus of the coating layer CL is about 3.0 GPa, the value of the surface strain occurring in the support layer SL is smaller than that when the modulus of the coating layer CL is about 2.0 GPa and is slightly greater than but substantially similar to that when the modulus of the coating layer CL is about 2.5 GPa.

Accordingly, the value of the surface strain occurring in the support layer SL decreases as the modulus of the coating layer CL increases, however, when the coating layer CL has the modulus equal to or greater than about 2.5 GPa, the value of the surface strain occurring in the support layer SL may maintain a constant value.

It is observed that there is a difference in the degree of reduction of the value of the strain occurring in the support layer SL depending on the thickness and the material of the coating layer CL as shown in FIGS. 7A and 7B. As the thickness of the coating layer CL increases, the maximum value of the strain occurring in the support layer SL may decrease. As the modulus of the material included in the coating layer CL increases, the maximum value of the strain occurring in the support layer SL may decrease. However, when the modulus of the coating layer CL is equal to or greater than a predetermined value, the maximum value of the strain may be maintained at a predetermined level.

FIG. 7C is a graph showing an embodiment of the value of the strain occurring in a module supporter according to the invention. FIG. 7C shows results obtained by performing a bending simulation on the module supporter MSP-A including the support bars SB-A having the different widths described with reference to FIG. 6. A case 1 means a simulation of the module supporter that does not include the coating layer CL-A, and a case 2 means a simulation of the module supporter that includes the coating layer CL-A. In the simulation, the coating layer CL-A including polycarbonate ("PC") and having a thickness T of about 100 µm is used.

Referring to FIG. 7C, a boundary strain occurring in the module supporter MSP-A that does not include the coating layer CL-A is about 0.52% and a surface strain occurring in the module supporter MSP-A that does not include the coating layer CL-A is about 0.35%. A boundary strain occurring in the module supporter MSP-A that includes the coating layer CL-A is about 0.6%, and a surface strain occurring in the module supporter MSP-A that includes the coating layer CL-A is about 0.19%. As the coating layer CL-A is disposed in the module supporter MSP-A, the value of the strain occurring in the support layer SL may be reduced by about 46%.

As described above, as the coating layer CL-A is disposed in the module supporter MSP-A, the strain occurring near the boundary between the support bars SB and the support layer SL-A may be more absorbed, and the maximum value of the strain occurring in the support layer SL may be reduced. Accordingly, the strain occurring in the module supporter MSP-A including the support bars SB-A having different widths from each other may also be reduced due to the coating layer CL disposed therein.

Figure 8A:
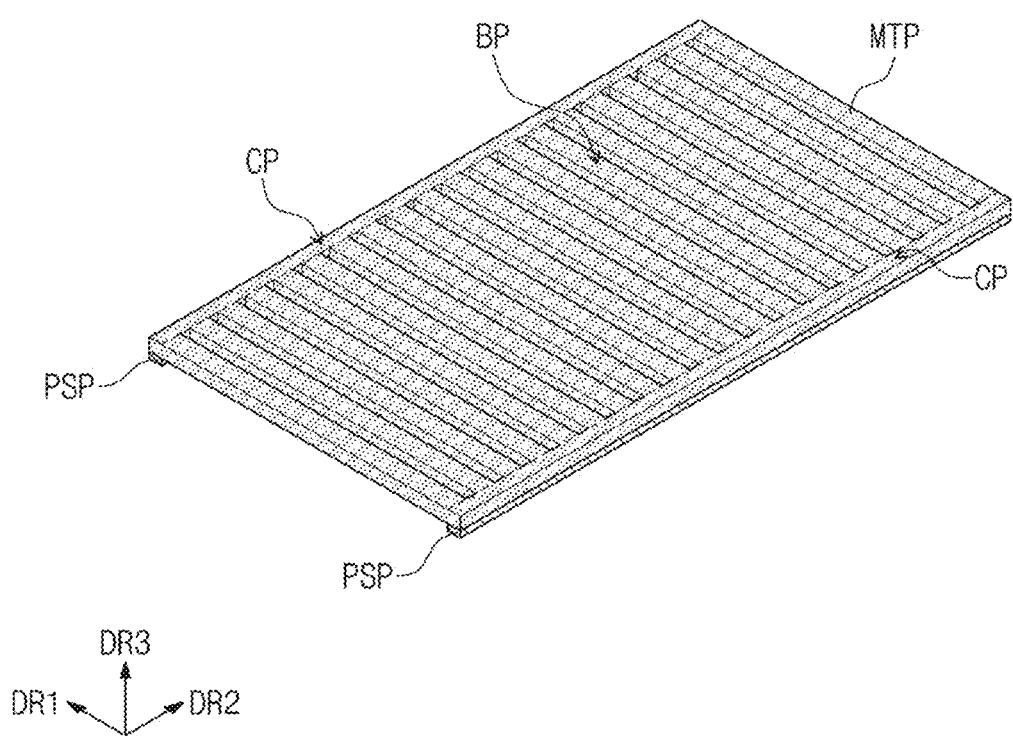
FIG. 8A is a perspective view of an embodiment of a method of manufacturing a display device according to the invention.

FIG. 8A is a perspective view of an embodiment of a method of manufacturing a display device according to the invention. FIGS. 8B to 8E are cross-sectional views of an embodiment of a method of manufacturing a display device according to the invention. FIG. 8F is a perspective view of a method of manufacturing a display device according to the invention. FIGS. 8A to 8F are views showing a method of manufacturing the module supporter MSP of the display device DD (refer to FIGS. 2A and 2B). FIGS. 8B to 8E are views showing cross-sections viewed in the second direction DR2. In FIGS. 8A to 8F, the same/similar reference numerals denote the same/similar elements in FIGS. 1 to 5E, and thus, detailed descriptions of the same/similar elements will be omitted.

Referring to FIG. 8A, the manufacturing method of the display device may include providing a metal plate MTP.

The metal plate MTP may include branch portions BP and connection portions CP. The branch portions BP may extend in the first direction DR1 and may be arranged in the second direction DR2. The connection portions CP may be arranged to connect one ends of the branch portions BP to each other and to connect the other ends of the branch portions BP to each other and may extend in the second direction DR2. The branch portions BP and the connection portions CP may correspond to one component included in the metal plate MTP, however, for the convenience of explanation, the branch portions BP and the connection portions CP will be described as separate components.

Plate supporters PSP may be disposed under the metal plate MTP and may support the metal plate MTP. The plate supporters PSP may extend in the second direction DR2 and may be arranged spaced apart from each other in the first direction DR1. The plate supporters PSP may be disposed to respectively overlap the connection portions CP spaced apart from each other in the first direction DR1.

Figure 8B:
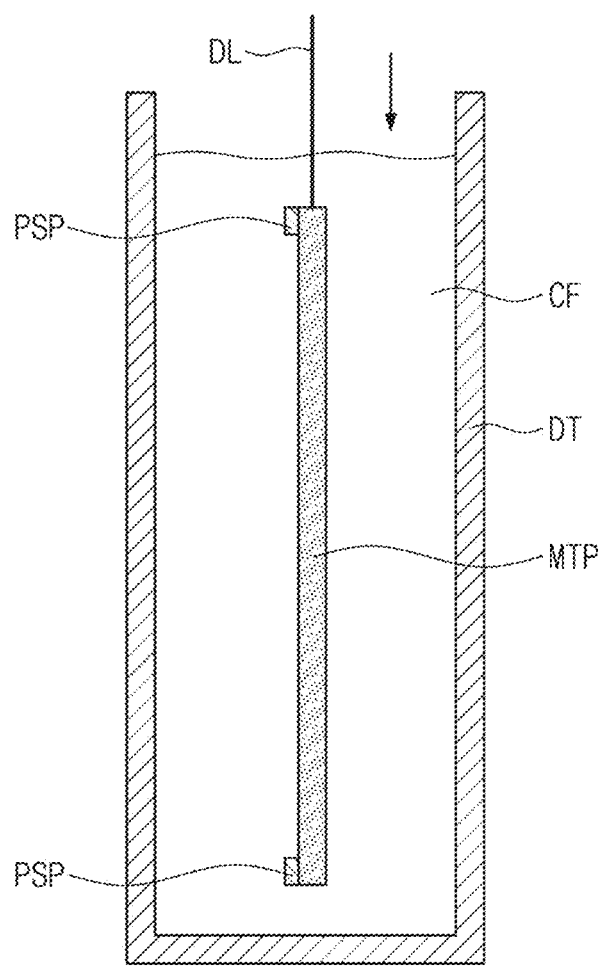
FIGS. 8B to 8E are cross-sectional views of an embodiment of a method of manufacturing a display device according to the invention.
Figure 8C:
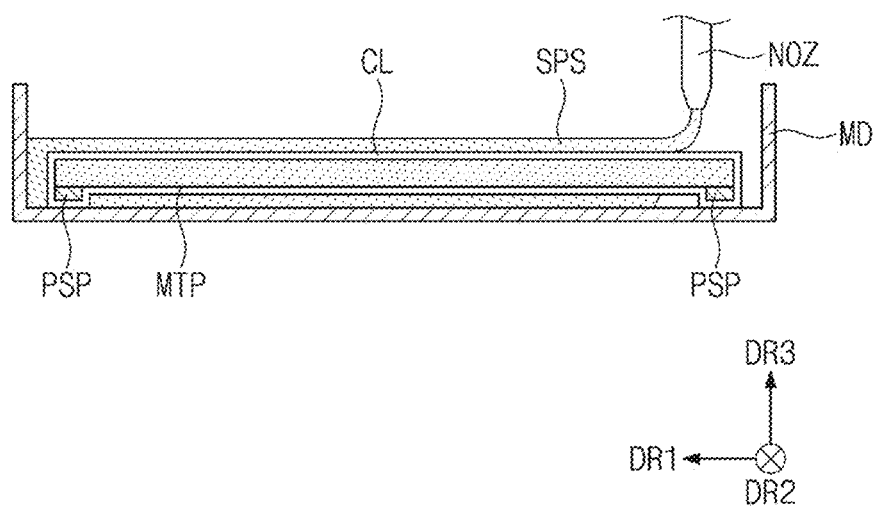

Then, referring to FIG. 8B and FIG. 8C, the manufacturing method of the display device may include forming the coating layer CL surrounding the metal plate MTP.

As shown in FIG. 8B, the metal plate MTP may be immersed in a coating solution CF provided in an immersion tank DT using an immersion line DL connected to the metal plate MTP. After the metal plate MTP is immersed in the coating solution CF for a predetermined period of time, the metal plate MTP may be taken out of the coating solution CF, and the coating solution CF on a surface of the metal plate MTP may be dried. As the entire surface of the metal plate MTP is coated with the coating solution CF, the coating layer CL surrounding the metal plate MTP may be formed. The thickness of the coating layer CL may be adjusted by controlling a time during which the metal plate MTP is immersed in the coating solution CF.

FIG. 8B shows the coating layer CL formed by a dip coating method, however, the method of forming the coating layer CL should not be limited thereto or thereby. The coating layer CL may be formed by a solution coating method. In an embodiment, the coating layer CL may be formed by one of a slot-die coating method, a doctor blade coating method, a bar coating method, and a spray coating method. However, since the metal plate MTP has a three-dimensional shape by the branch portions BP, the dip coating method is the most advantageous for the coating of the entire surface of the branch portions BP.

Figure 8D:
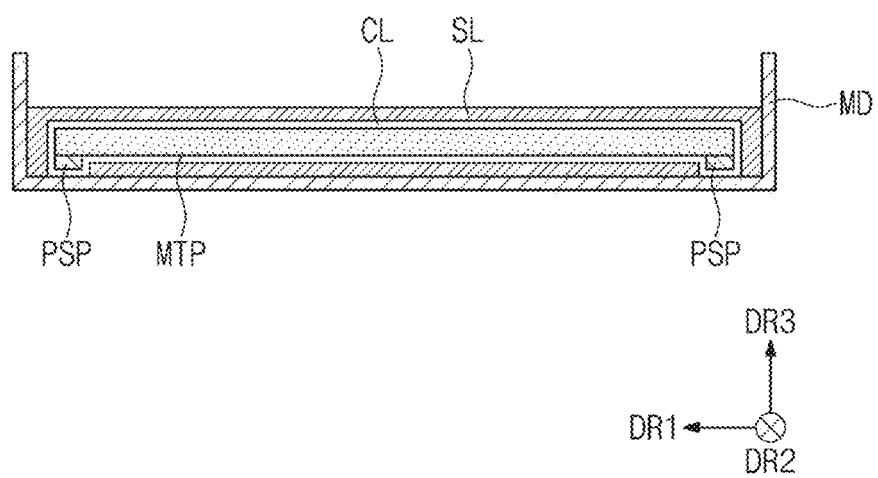

Referring to FIGS. 8C and 8D, the manufacturing method of the display device may include forming the support layer SL covering the coating layer CL.

After the metal plate MTP and the plate supporters PSP are disposed in a mold MD, a suspension SPS may be provided in the mold MD. As the suspension SPS is filled higher than the metal plate MTP surrounded by the coating layer CL, the metal plate MTP may be submerged in the suspension SPS. In this case, the metal plate MTP may be supported by the plate supporters PSP in the mold MD.

The suspension SPS may be a flowable resin to form the support layer SL. The suspension SPS may have a low viscosity and a high fluidity to easily flow between the branch portions BP. In an embodiment, the suspension SPS may have the viscosity of about 50 centipoise (cP) to about 5000 cP. The support layer SL covering the coating layer CL may be formed by curing the suspension SPS provided in the mold MD.

Figure 8E:
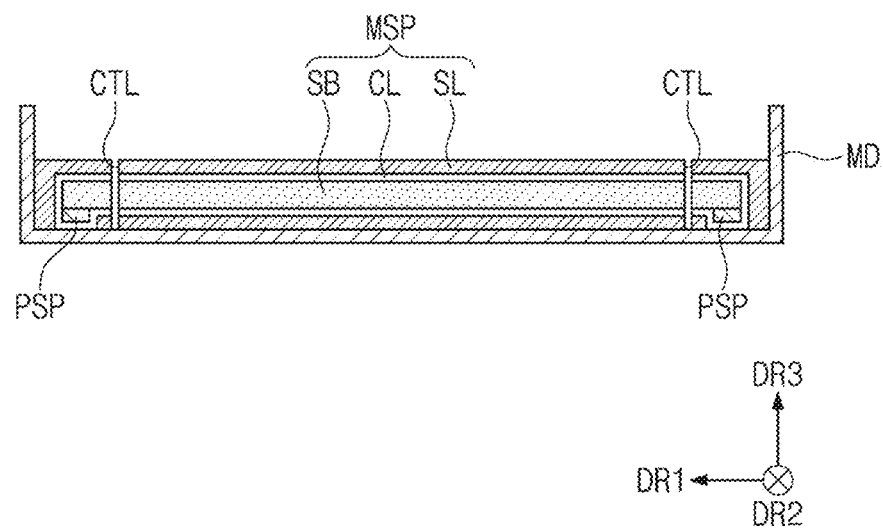
Figure 8F:
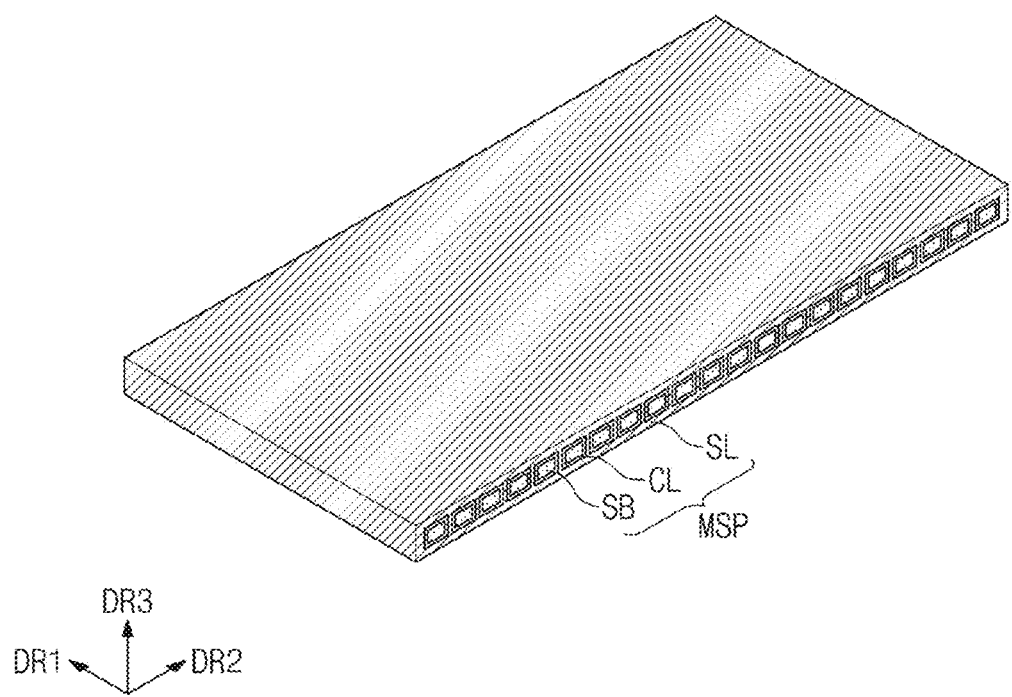
FIG. 8F is a perspective view of an embodiment of a method of manufacturing a display device according to the invention.

Referring to FIG. 8E and FIG. 8F, the manufacturing method of the display device may include forming the support bars SB.

As shown in FIG. 8E, the module supporter MSP may be formed by cutting the metal plate MTP, the coating layer CL, and the support layer SL along cutting lines CTL extending in the second direction DR2. The connection portions CP and end portions of the branch portions BP, which are respectively adjacent to the connection portions CP of the metal plate MTP, may be removed, center portions of the branch portions, which are not removed, may form the support bars SB extending in the first direction DR1 and arranged spaced apart from each other in the second direction DR2. In addition, the coating layer CL may be partially removed and may be provided in plural to respectively cover the support bars SB.

As shown in FIG. 8F, the module supporter MSP that includes the support layer SL, the coating layers CL disposed in the support layer SL, and the support bars SB each being disposed in the corresponding coating layer among the coating layers CL may be manufactured. Opposite ends of the support bars SB and the coating layers CL, which are opposite to each other in the first direction DR1, may be exposed to the outside by the process of cutting the metal plate MTP, the coating layer CL, and the support layer SL along the cutting lines CTL.

Although the embodiments of the invention have been described, it is understood that the invention should not be limited to these embodiments but various changes and modifications may be made by one ordinary skilled in the art within the spirit and scope of the invention as hereinafter claimed.

Therefore, the disclosed subject matter should not be limited to any single embodiment described herein, and the scope of the invention shall be determined according to the attached claims.

What is claimed is:

1. A display device comprising:
   a display module rolled in a second direction crossing a first direction with respect to a rolling axis extending in the first direction; and
   a module supporter disposed under the display module, the module supporter comprising:
   a support layer;
   a plurality of coating layers disposed in the support layer, extending in the first direction, and arranged in the second direction; and
   a plurality of support bars each being disposed in a corresponding coating layer among the plurality of coating layers,
   wherein the plurality of coating layers has a modulus greater than a modulus of the support layer,
   wherein the plurality of coating layers covers the plurality of support bars, and
   wherein the plurality of support bars does not contact the support layer.

2. The display device of claim 1, wherein the plurality of coating layers has a modulus smaller than a modulus of the plurality of support bars.

3. The display device of claim 1, wherein the support layer has a modulus equal to or greater than about 10 kilopascals and equal to or smaller than about 100 kilopascals, the plurality of support bars has a modulus equal to or greater than about 50 gigapascals and equal to or smaller than about 500 gigapascals, and the plurality of coating layers has a modulus equal to or greater than about 100 megapascals and equal to or smaller than about 10 gigapascals.

4. The display device of claim 1, wherein each of the plurality of support bars comprises a metal material or a carbon fiber,
   each of the plurality of coating layers comprises a polymer material, and
   the support layer comprises an elastomer.

5. The display device of claim 1, wherein each of the plurality of support bars has a quadrangular shape, a rhombus shape, an inverse trapezoidal shape, or an inverse triangular shape in a cross-section.

6. The display device of claim 1, wherein the plurality of support bars comprises first support bars and second support bars alternately arranged with the first support bars, the first support bars are closer to an upper surface of the support layer adjacent to the display module than the second support bars are, the second support bars are closer to a lower surface opposite to the upper surface than the first support bars are, and the first support bars have a symmetrical shape with the second support bars with respect to the second direction in a cross-section.

7. The display device of claim 6, wherein the first and second support bars have a trapezoidal shape or a triangular shape in the cross-section.

8. The display device of claim 1, wherein each of the plurality of support bars has a width equal to or greater than about 0.4 millimeters and equal to or smaller than about 0.8 millimeters in the second direction.

9. The display device of claim 1, wherein the plurality of support bars comprises:
   a center support bar disposed at a center of the module supporter; and
   left support bars and right support bars, which are symmetrical with respect to the center support bar interposed therebetween in the second direction, the center support bar has a smallest width in the second direction, and each of the left support bars and the right support bars have a width in the second direction gradually increasing as a distance from the center support bar increases.

10. The display device of claim 1, wherein each of the plurality of coating layers has a thickness equal to or smaller than about 200 micrometers in a cross-section.

11. A display device comprising:
    a display module rolled in a second direction crossing a first direction with respect to a rolling axis extending in the first direction; and
    a module supporter disposed under the display module, the module supporter comprising:
    a support layer;
    a plurality of coating layers disposed in the support layer, extending in the first direction, and arranged in the second direction; and
    a plurality of support bars each being disposed in a corresponding coating layer among the plurality of coating layers, wherein the plurality of coating layers has a modulus corresponding to a median value of a sum of a modulus of the support layer and a modulus of the plurality of support bars.

12. A display device comprising:
    a display module rolled in a second direction crossing a first direction with respect to a rolling axis extending in the first direction; and a module supporter disposed under the display module, the module supporter comprising:
- a support layer;
- a plurality of support bars disposed in the support layer, extending in the first direction, and arranged in the second direction; and
- a plurality of coating layers disposed in the support layer and surrounding at least a portion of the plurality of support bars, wherein the plurality of coating layers have a modulus greater than a modulus of the support layer and smaller than a modulus of the plurality of support bars
- wherein the plurality of coating layers covers the plurality of support bars, and
- wherein the plurality of support bars does not contact the support layer.

13. The display device of claim 12, wherein the plurality of coating layers extends in the first direction and are arranged in the second direction, and each of the plurality of support bars is disposed in a corresponding coating layer among the plurality of coating layers.

14. The display device of claim 12, wherein the support layer has the modulus equal to or greater than about 10 kilopascals and equal to or smaller than about 100 kilopascals, the plurality of support bars has the modulus equal to or greater than about 50 gigapascals and equal to or smaller than about 500 gigapascals, and the plurality of coating layers has the modulus equal to or greater than about 100 megapascals and equal to or smaller than about 10 gigapascals.

15. The display device of claim 12, wherein the modulus of the plurality of coating layers corresponds to a median value of a sum of the modulus of the support layer and the modulus of the support bars.

16. The display device of claim 12, wherein each of the plurality of coating layers comprises a polymer material,
- each of the plurality of support bars comprises a metal material, and
- the support layer comprises an elastomer.

17. The display device of claim 12, wherein each of the plurality of support bars has a quadrangular shape, a rhombus shape, an inverse trapezoidal shape, or an inverse triangular shape in a cross-section.

18. The display device of claim 12, wherein the plurality of support bars comprises first support bars and second support bars alternately arranged with the first support bars, the first support bars are closer to an upper surface of the support layer adjacent to the display module than the second support bars are, the second support bars are closer to a lower surface opposite to the upper surface than the first support bars are, and the first support bars have a symmetrical shape with the second support bars with respect to the second direction in a cross-section.

* * * * *